(12) United States Patent
Ueda et al.

(10) Patent No.: US 7,292,004 B2
(45) Date of Patent: Nov. 6, 2007

(54) MOTOR DRIVING APPARATUS

(75) Inventors: Mitsuo Ueda, Hyogo (JP); Hideki Nakata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/822,798

(22) Filed: Apr. 13, 2004

(65) Prior Publication Data
US 2004/0245961 A1    Dec. 9, 2004

(30) Foreign Application Priority Data
Apr. 14, 2003   (JP)   ............... 2003-109395

(51) Int. Cl.
*H02P 21/00* (2006.01)
(52) U.S. Cl. .................. 318/805; 318/801; 318/808; 318/802; 318/811
(58) Field of Classification Search .................. None
See application file for complete search history.

(56) References Cited

U.S. PATENT DOCUMENTS

| | | | | |
|---|---|---|---|---|
| 4,362,976 A | * | 12/1982 | Fujioka et al. | 388/819 |
| 4,473,790 A | * | 9/1984 | Plunkett et al. | 318/298 |
| 4,876,637 A | * | 10/1989 | Mose et al. | 363/37 |
| 5,646,499 A | * | 7/1997 | Doyama et al. | 318/801 |
| 6,002,220 A | * | 12/1999 | Takahashi et al. | 318/139 |
| 6,046,554 A | * | 4/2000 | Becerra | 318/254 |
| 6,254,353 B1 | * | 7/2001 | Polo et al. | 417/44.11 |
| 6,367,273 B2 | * | 4/2002 | Takagi et al. | 62/230 |
| 6,504,338 B1 | * | 1/2003 | Eichorn | 318/727 |

FOREIGN PATENT DOCUMENTS

| | | |
|---|---|---|
| JP | 7-337088 | 12/1995 |
| JP | 10-150795 | 6/1998 |
| JP | 2000-308353 | 11/2000 |
| JP | 2002-51589 | 2/2002 |

\* cited by examiner

*Primary Examiner*—Lincoln Donovan
*Assistant Examiner*—Renata McCloud
(74) *Attorney, Agent, or Firm*—Wenderoth, Lind & Ponack, L.L.P.

(57) ABSTRACT

A motor driving apparatus for driving a motor includes a single-phase rectifier circuit having an input connected to a single-phase AC power supply, an inverter circuit that is connected to the single-phase rectifier circuit and applies a current and a voltage to the motor, and an inverter control unit for controlling the inverter circuit. The inverter control unit controls the current applied to the motor, i.e., the output of the inverter circuit, so that the inverter input voltage becomes equal to the absolute value of the voltage of the single-phase AC power supply.

17 Claims, 15 Drawing Sheets

MOTOR DRIVING APPARATUS

FIELD OF THE INVENTION

The present invention relates to a motor driving apparatus and, more particularly, to a motor driving apparatus for driving a motor by a system comprising a single-phase rectifier circuit and an inverter.

BACKGROUND OF THE INVENTION

A conventional motor driving apparatus drives a motor by using a common system comprising a single-phase rectifier circuit and an inverter. The single-phase rectifier circuit has a reactor for improving a power factor (not shown), and a smoothing capacitor for smoothing an output voltage of the single-phase rectifier circuit.

In the conventional motor driving apparatus so constructed, the smoothing capacitor and the power-factor improvement reactor have large capacitances, resulting in problems in the cost, lifetime, efficiency, weight, size, and the like of the motor driving apparatus. The large-capacitance smoothing capacitor and the large-capacitance reactor are employed to prevent degradation in the power factor due to distortion in the waveform of the current that flows from the power supply to the motor driving apparatus. In other words, in the motor driving apparatus, when the values of the smoothing capacitor and the reactor become small, the power factor is degraded due to distortion in the waveform of the current that flows from the power supply to the motor driving apparatus, leading to an increase in harmonic components. As a result, the motor driving apparatus cannot satisfy the IEC (International Electrotechnical Commission) harmonics standards.

Thus, there has been proposed a method for drastically decreasing the capacitances of the smoothing capacitor and the power-factor improvement reactor, and further, for improving the input power factor of the motor driving apparatus (for example, Japanese Published Patent Application No. 2002-51589).

Hereinafter, a description will be given of a motor driving apparatus using the method disclosed in Japanese Published Patent Application No. 2002-51589 (first prior art).

FIG. 11 is a block diagram for explaining a motor driving apparatus according to the first prior art.

With reference to FIG. 11, a motor driving apparatus 100 includes a single-phase rectifier circuit 3 having an input connected to a single-phase AC voltage (power) supply 1, and an inverter circuit 4 that is connected to the single-phase rectifier circuit 3 and outputs a current and a voltage to a motor 2.

The single-phase rectifier circuit 3 includes first and second diodes 31 and 32 connected in series, and third and fourth diodes 33 and 34 connected in series. The cathodes of the first and third diodes 31 and 33 are connected to each other, and the connection node is an output node 3a of the single-phase rectifier circuit 3. The anodes of the second and fourth diodes 32 and 34 are connected to each other, and the connection node is the other output node 3b of the single-phase rectifier circuit 3. A smoothing capacitor 12a is connected between the output nodes 3a and 3b of the single-phase rectifier circuit 3. Further, an output terminal of the single-phase AC voltage supply 1 is connected to the connection node 3c of the first and second diodes 31 and 32, while the other output terminal of the single-phase AC voltage supply 1 is connected to the connection node 3d of the third and fourth diodes 33 and 34.

Further, the inverter circuit 4 comprises first and second switching elements 41 and 42 connected in series, third and fourth switching elements 43 and 44 connected in series, and fifth and sixth switching elements 45 and 46 connected in series. One end (higher-voltage-side terminals) of each of the first, third, and fifth switching elements 41, 43, and 45 are connected to each other, and the connection node (one input node) is connected to the one output node 3a of the single-phase rectifier circuit 3. One end (lower-voltage-side terminals) of each of the second, fourth, and sixth switching elements 42, 44, and 46 are connected to each other, and the connection node (the other input node) is connected to the other output node 3b of the single-phase rectifier circuit 3. Further, first to sixth diodes 51 to 56 are connected in inverse-parallel to the first to sixth switching elements 41 to 46, respectively. The connection node 4a of the first and second switching elements 41 and 42 is a first output node of the inverter circuit 4, the connection node 4b of the third and fourth switching elements 43 and 44 is a second output node of the inverter circuit 4, and the connection node 4c of the fifth and sixth switching elements 45 and 46 is a third output node of the inverter circuit 4. The first to third output nodes 4a to 4c of the inverter circuit 4 are the input nodes of the respective phases of the three-phase input of the motor 2.

The motor driving apparatus 100 further includes a current command calculation unit 14 for outputting a current command value io on the basis of an absolute value |v| of a voltage outputted from the single-phase AC voltage supply 1, a command torque To supplied from the outside (i.e., externally supplied), and a current (DC link current) idc that flows between the single-phase rectifier circuit 3 and the inverter circuit 4. The motor driving apparatus 100 also includes a current control unit 15 for outputting a drive signal (gate signal) Sg to the gates of the respective switching elements 41 to 46 of the inverter circuit 4 on the basis of the current command value io, and a current i that actually flows in the motor 2.

The current command calculation unit 14 modulates the command torque To supplied from the outside by the absolute value |v| of the output voltage v of the single-phase AC voltage supply 1 to generate a modulated torque waveform, and calculates a current command value io so that the waveform of the DC link current idc becomes equal to the waveform of the modulated torque. The current control unit 15 compares the current command value io calculated by the current command calculation unit 14 with the current i that actually flows in the motor 2, and controls the inverter circuit 4 with the gate signal Sg so as to eliminate a deviation between the current command value io and the current i. Actually, the current control circuit 15 performs control such as a three-phase to two-phase conversion of the current i to be controlled.

In the motor driving apparatus 100 (first prior art), the waveform of the DC link current idc that flows between the single-phase rectifier circuit 3 and the inverter circuit 4 becomes equal to the waveform of the absolute value |v| of the voltage v outputted from the single-phase AC power supply 1, whereby the current waveform of the single-phase AC power supply 1 is improved, resulting in an increase in the power factor. Therefore, the capacitances of the smoothing capacitor and the power-factor improvement reactor can be reduced.

However, when the capacitance of the smoothing capacitor is reduced, the input voltage of the inverter circuit 4 pulses. As a result, the level of the input voltage of the inverter circuit 4 is lowered, and a desired voltage to be applied to, for example, a brushless DC motor, cannot be obtained.

In order to solve this problem, there has been proposed a motor driving apparatus (second prior art) for advancing the phase of the output voltage when the output voltage of the inverter circuit is saturated (for example, Japanese Published Patent Application No. Hei. 10-150795).

In this motor driving apparatus (second prior art), when the output voltage of the inverter circuit that outputs the motor driving voltage is saturated, i.e., when the level of the output voltage of the inverter circuit becomes equal to or higher than the level of the input voltage, the phase of the motor driving voltage (inverter output voltage) is advanced to set the brushless motor in a so-called weak field state, thereby reducing the level of the driving voltage which is required for the brushless motor. Therefore, even when the input voltage of the inverter circuit 4 is small, the output voltage of the inverter circuit 4 is prevented from becoming saturated, whereby the motor can continue to drive.

In the motor driving apparatus 100 as the first prior art, however, a charging current to the smoothing capacitor 12a is not considered. Therefore, satisfactory effects of power factor improvement cannot be obtained by only modulating the motor driving current so that the waveform thereof becomes equal to the waveform of the input power supply voltage by using the absolute value of the inputted power supply voltage.

Further, in the first prior art, since modulation of the motor driving current is realized by matching the waveform of the DC link current idc that flows between the single-phase rectifier circuit 3 and the inverter circuit 4 to the modulated waveform of the command torque To, detection of the DC link current idc is indispensable. Moreover, control of the motor driving current is very complicated, that is, control of the motor driving current comprises the steps of calculating the current command value io on the basis of the DC link current idc and the modulated waveform of the command torque To, and adjusting the gate signal Sg to be applied to the inverter circuit 4 so as to eliminate a deviation between the calculated current command value io and the actual driving current i.

Furthermore, since the motor driving current is vigorously modulated by using the output waveform of the AC power supply, the output torque of the motor is also modulated by the output waveform of the AC current supply, resulting in a possibility that significant noise and vibration might occur in a high-load area. Moreover, since the motor driving current is modulated, the threshold torque that can be output from the motor controlled by the motor driving apparatus might be reduced.

Furthermore, since the command torque To is modulated by the absolute value |v| of the power supply voltage v of the command torque To, the instantaneous value of the power supply voltage must be detected. As a result, an AD converter for detecting an analog value and a microcomputer for detecting the instantaneous value on the basis of the output of the AD converter are required, leading to an increase in cost.

On the other hand, in the motor driving apparatus as the second prior art, when the output voltage of the inverter circuit is saturated and the induced voltage of the motor is increased, the phase of the output voltage is advanced so as to maintain the current supply to the motor. However, this leads to a reduction in efficiency of the motor. That is, even when the output voltage of the inverter circuit becomes lower than the induced voltage of the motor, the motor driving current continues to flow and the torque continues to occur for a while because of a reactance component existing in the motor. At this time, advancing the output voltage of the inverter circuit leads to an increase in the phase difference between the output current and the output voltage, resulting in a reduction in the motor driving efficiency. Moreover, advancing the phase of the output voltage of the inverter circuit to prevent saturation of the output voltage is technically very difficult.

Further, the second prior art has the following fundamental problem. That is, in the state where the regenerative current of the motor flows, there is a possibility that the input voltage of the inverter circuit is increased by charging and thereby the output voltage of the inverter circuit is not saturated. In this case, the output voltage of the inverter circuit is not saturated even in the section where the regenerative current flows and the phase of the voltage to be applied to the motor must be advanced, and therefore, the motor driving apparatus stops the operation of advancing the phase of the output voltage of the inverter circuit. As a result, there is a possibility that the regenerative current cannot be stopped.

Furthermore, in the second prior art, even when the phase of the output voltage of the inverter circuit is advanced, the state where the output voltage of the inverter is lower than the induced voltage of the motor is maintained. When a predetermined period of time has passed under this state, a backward current flows from the motor to the inverter circuit, and thereby the power is regenerated. Since the current that causes this regenerative power applies a brake to the motor, the motor driving efficiency is lowered. Moreover, since, during this regeneration period, no current is supplied from the single-phase AC power supply to the inverter circuit, the current waveform of the single-phase AC power supply is distorted, resulting in a reduction in the input power factor of the inverter circuit.

SUMMARY OF THE INVENTION

The present invention is made to solve the above-described problems. Accordingly, an object of the present invention is to provide a motor driving apparatus satisfying the IEC harmonics standards, that can minimize reduction in the power factor due to waveform distortion of the current supplied from the power supply by controlling the motor driving current or motor driving voltage, thereby to minimize the reactance which is required for the circuit construction, especially, the capacitor reactance, and moreover, that can carry out control of the motor driving current or voltage by a relatively simple construction so as to maintain high efficiency of motor drive and effectively minimize reduction in the power factor.

Other objects and advantages of the present invention will become apparent from the following detailed description. The detailed description and specific embodiments described herein are provided only for illustration since various additions and modifications within the scope of the invention will be apparent to those of skill in the art from the detailed description.

According to a first aspect of the present invention, a motor driving apparatus for driving a motor comprises: a rectifier circuit having an input connected to a single-phase AC power supply; an inverter circuit which is connected to the rectifier circuit and outputs a current and a voltage to the motor; and an inverter control unit for controlling the inverter circuit so as to drive the motor. The inverter control unit includes a power supply voltage estimation unit for estimating a voltage of the single-phase AC power supply, and changes the value of the current or voltage outputted from the inverter circuit, according to the power supply voltage estimated by the power supply voltage estimation unit. Therefore, reduction in the power factor due to waveform distortion in the current supplied from the power supply is minimized by controlling the motor driving current or motor driving voltage that is the output of the inverter circuit, thereby reducing the reactance that is required on constituting a circuit, especially the capacitive reactance.

Further, since the value of the output current or output voltage of the inverter circuit is controlled according to the power supply voltage estimated by the power supply voltage estimation unit, control of the motor driving current or motor driving voltage can be realized by a relatively simple construction, as compared with the conventional power-factor improvement method (first prior art) which modulates the motor driving current according to the output waveform of the AC power supply.

Furthermore, since the output current or output voltage of the inverter circuit is controlled according to the estimated power supply voltage, control of the inverter circuit is carried out by considering a regenerative current from the motor to the inverter circuit, in contrast to the conventional power-factor improvement method (second prior art) which controls the phase of the motor driving voltage according to the induced voltage of the motor, thereby avoiding reduction in motor driving efficiency and degradation in input power factor, which are caused by the regenerative current.

As a result, it is possible to obtain a motor driving apparatus that satisfies the IEC harmonics standards and that is able to efficiently suppress reduction in the power factor while maintaining a high degree of motor driving efficiency, by a relatively simple circuit construction.

According to a second aspect of the present invention, in the motor driving apparatus according to the first aspect, the inverter control unit performs at least one of a first control and a second control. The first control is to decrease the value of the output current or output voltage of the inverter circuit when the power supply voltage estimated by the power supply voltage estimation unit is changing from a zero voltage to a peak voltage. The second control is to increase the value of the output current or output voltage of the inverter circuit when the power supply voltage estimated by the power supply voltage estimation unit is changing from the peak voltage to the zero voltage. Therefore, control of the output current or output voltage of the inverter circuit becomes an open-loop control, which is carried out with stability and high responsivity.

According to a third aspect of the present invention, in the motor driving apparatus according to the first aspect, the power supply voltage estimation unit has a zerocross detection unit for detecting a zerocross timing of the single-phase AC power supply, and estimates a voltage of the single-phase AC power supply from the zerocross timing detected by the zerocross detection unit. Therefore, it is possible to easily estimate the voltage waveform of the single-phase AC power supply without using expensive elements such as an AD converter for AD-converting a monitor signal of the power supply voltage.

According to a fourth aspect of the present invention, in the motor driving apparatus according to the first aspect, the inverter control unit has an inverter input voltage detection unit for detecting the voltage inputted to the inverter circuit, compares the absolute value of the power supply voltage estimated by the power supply voltage estimation unit with the inverter input voltage detected by the inverter input voltage detection unit, and performs at least one of a first control and a second control. The first control is to increase the value of the output current or output voltage of the inverter circuit when the inverter input voltage is higher than the absolute value of the estimated power supply voltage, and the second control is to decrease the value of the output current or output voltage of the inverter circuit when the inverter input voltage is lower than the absolute value of the estimated power supply voltage. Therefore, the inverter input voltage becomes approximately equal to the absolute value of the voltage of the single-phase AC power supply by the feedback control of the inverter circuit, thereby increasing the pulse width of the current that flows from the single-phase AC power supply to the inverter circuit. As a result, reduction in the input power factor can be efficiently suppressed while maintaining a high degree of motor driving efficiency, even when the motor driving current varies due to disturbances such as a temperature change.

According to a fifth aspect of the present invention, in the motor driving apparatus according to the fourth aspect, the motor is a DC brushless motor, the first control is to advance the phase of the output current or output voltage of the inverter circuit when the inverter input voltage is higher than the absolute value of the estimated power supply voltage, and the second control is to delay the phase of the output current or output voltage of the inverter circuit when the inverter input voltage is lower than the absolute value of the estimated power supply voltage. Therefore, reduction in the power factor due to waveform distortion in the current supplied from the power supply is minimized by controlling the motor driving current or motor driving voltage as the output of the inverter circuit, and, particularly, a regenerative current from the DC brushless motor is reduced to enhance the motor driving efficiency. As a result, it is possible to obtain a motor driving apparatus that is suitable to a DC brushless motor, satisfies the IEC harmonics standards, and effectively suppresses reduction in the power factor while maintaining a high degree of motor driving efficiency, by a relatively simple circuit construction.

According to a sixth aspect of the present invention, in the motor driving apparatus according to the fourth aspect, the motor is an induction motor, the first control is to decrease the angular velocity of the output current or output voltage of the inverter circuit when the inverter input voltage is higher than the absolute value of the estimated power supply voltage, and the second control is to increase the angular velocity of the output current or output voltage of the inverter circuit when the inverter input voltage is lower than the absolute value of the estimated power supply voltage. Therefore, reduction in the power factor due to waveform distortion in the current supplied from the power supply is minimized by controlling the motor driving current or motor driving voltage as the output of the inverter circuit, and, particularly, a regenerative current from the induction motor is reduced to enhance the motor driving efficiency. As a result, it is possible to obtain a motor driving apparatus that is suitable for an induction motor, satisfies the IEC harmonics standards, and effectively suppresses reduction in the power factor while maintaining a high degree of motor driving efficiency, by a relatively simple circuit construction.

According to a seventh aspect of the present invention, in the motor driving apparatus according to the fourth aspect, the power supply voltage estimation unit includes a timing detection unit for detecting a timing at which the inverter input voltage attains a maximum value, on the basis of the inverter input voltage detected by the inverter input voltage detection unit and estimates a voltage of the single-phase AC power supply on the basis of the timing detected by the timing detection unit, and the inverter input voltage value that is an output from the inverter input voltage detection unit at this timing. Therefore, a circuit for monitoring the power supply voltage is dispensed with, and the voltage waveform of the single-phase AC power supply is easily estimated by the circuit construction including a smaller number of components.

According to an eighth aspect of the present invention, in the motor driving apparatus according to the first aspect, the rectifier circuit has a capacitor for charging a regenerative current from the motor. Therefore, it is possible to suppress an increase in the inverter input voltage, which would unfavorably occur when the motor is stopped or the switching operation of the inverter circuit is stopped, thereby avoiding destruction of the components or the like.

According to a ninth aspect of the present invention, in the motor driving apparatus according to the first aspect, the rectifier circuit has an inductor for cutting noise that occurs in the inverter circuit. Therefore, it is possible to reduce switching noise that occurs in the single-phase AC power supply, resulting in a motor driving apparatus having an improved input power factor and improved current waveform.

According to a tenth aspect of the present invention, there is provided a compressor including a motor for generating a power, and a motor driving apparatus for driving the motor, where the motor driving apparatus is a motor driving apparatus according to the above-described first aspect. Therefore, it is possible to reduce the values of capacitors and inductors included in the motor driving apparatus while minimizing reduction in the power factor due to waveform distortion in the current supplied from the power supply. Thereby, the motor driving apparatus included in the compressor is reduced in size and weight while satisfying the restrictions on the input power factor and the IEC harmonics standards, leading to an inexpensive compressor having a high degree of freedom in design.

According to an eleventh aspect of the present invention, there is provided an air conditioner including a compressor having a motor for generating a power, and a motor driving apparatus for driving the motor of the compressor, where the motor driving apparatus is a motor driving apparatus according to the above-described first aspect. Therefore, it is possible to reduce the values of capacitors and inductors included in the motor driving apparatus while minimizing reduction in the power factor due to waveform distortion in the current supplied from the power supply. Thereby, the motor driving apparatus included in the air conditioner is reduced in size and weight while satisfying the restrictions on the input power factor and the IEC harmonics standards, leading to an inexpensive air conditioner having a high degree of freedom in design.

According to a twelfth aspect of the present invention, there is provided a refrigerator including a compressor having a motor for generating a power, and a motor driving apparatus for driving the motor of the compressor, where the motor driving apparatus is a motor driving apparatus according to the above-described first aspect. Therefore, it is possible to reduce the values of capacitors and inductors included in the motor driving apparatus while minimizing reduction in the power factor due to waveform distortion in the current supplied from the power supply. Thereby, the motor driving apparatus included in the refrigerator is reduced in size and weight while satisfying the restrictions on the input power factor and the IEC harmonics standards, leading to an inexpensive refrigerator having a high degree of freedom in design.

According to a thirteenth aspect of the present invention, there is provided an electric washing machine including a motor for generating a power, and a motor driving apparatus for driving the motor, where the motor driving apparatus is a motor driving apparatus according to the above-described first aspect. Therefore, it is possible to reduce the values of capacitors and inductors included in the motor driving apparatus. Thereby, the motor driving apparatus included in the washing machine is reduced in size and weight while satisfying the restrictions on the input power factor and the IEC harmonics standards, leading to an inexpensive washing machine having a high degree of freedom in design.

According to a fourteenth aspect of the present invention, there is provided an air blower including a motor for generating a power, and a motor driving apparatus for driving the motor, where the motor driving apparatus is a motor driving apparatus according to the above-described first aspect. Therefore, it is possible to reduce the values of capacitors and inductors included in the motor driving apparatus. Thereby, the motor driving apparatus included in the air blower is reduced in size and weight while satisfying the restrictions on the input power factor and the IEC harmonics standards, leading to an inexpensive air blower having a high degree of freedom in design.

According to a fifteenth aspect of the present invention, there is provided an electric vacuum cleaner including a motor for generating a power, and a motor driving apparatus for driving the motor, where the motor driving apparatus is a motor driving apparatus according to the above-described first aspect. Therefore, it is possible to reduce the values of capacitors and inductors included in the motor driving apparatus. Thereby, the motor driving apparatus included in the vacuum cleaner is reduced in size and weight while satisfying the restrictions on the input power factor and the IEC harmonics standards, leading to an inexpensive vacuum cleaner having a high degree of freedom in design.

According to a sixteenth aspect of the present invention, there is provided an electric dryer including a compressor having a motor for generating a power, and a motor driving apparatus for driving the motor of the compressor, where the motor driving apparatus is motor driving apparatus according to the above-described first aspect. Therefore, it is possible to reduce the values of capacitors and inductors included in the motor driving apparatus. Thereby, the motor driving apparatus included in the dryer is reduced in size and weight while satisfying the restrictions on the input power factor and the IEC harmonics standards, leading to an inexpensive dryer having a high degree of freedom in design.

According to a seventeenth aspect of the present invention, there is provided a heat pump type hot-water supply unit including a compressor having a motor for generating a power, and a motor driving apparatus for driving the motor of the compressor, where the motor driving apparatus is a motor driving apparatus according to the above-described first aspect. Therefore, it is possible to reduce the values of capacitors and inductors included in the motor driving apparatus. Thereby, the motor driving apparatus included in the hot-water supply unit is reduced in size and weight while satisfying the restrictions on the input power factor and the IEC harmonics standards, leading to an inexpensive hot-water supply unit having a high degree of freedom in design.

DETAILED DESCRIPTION OF THE PREFERRED EMBODIMENTS

First Embodiment

Figure 1:
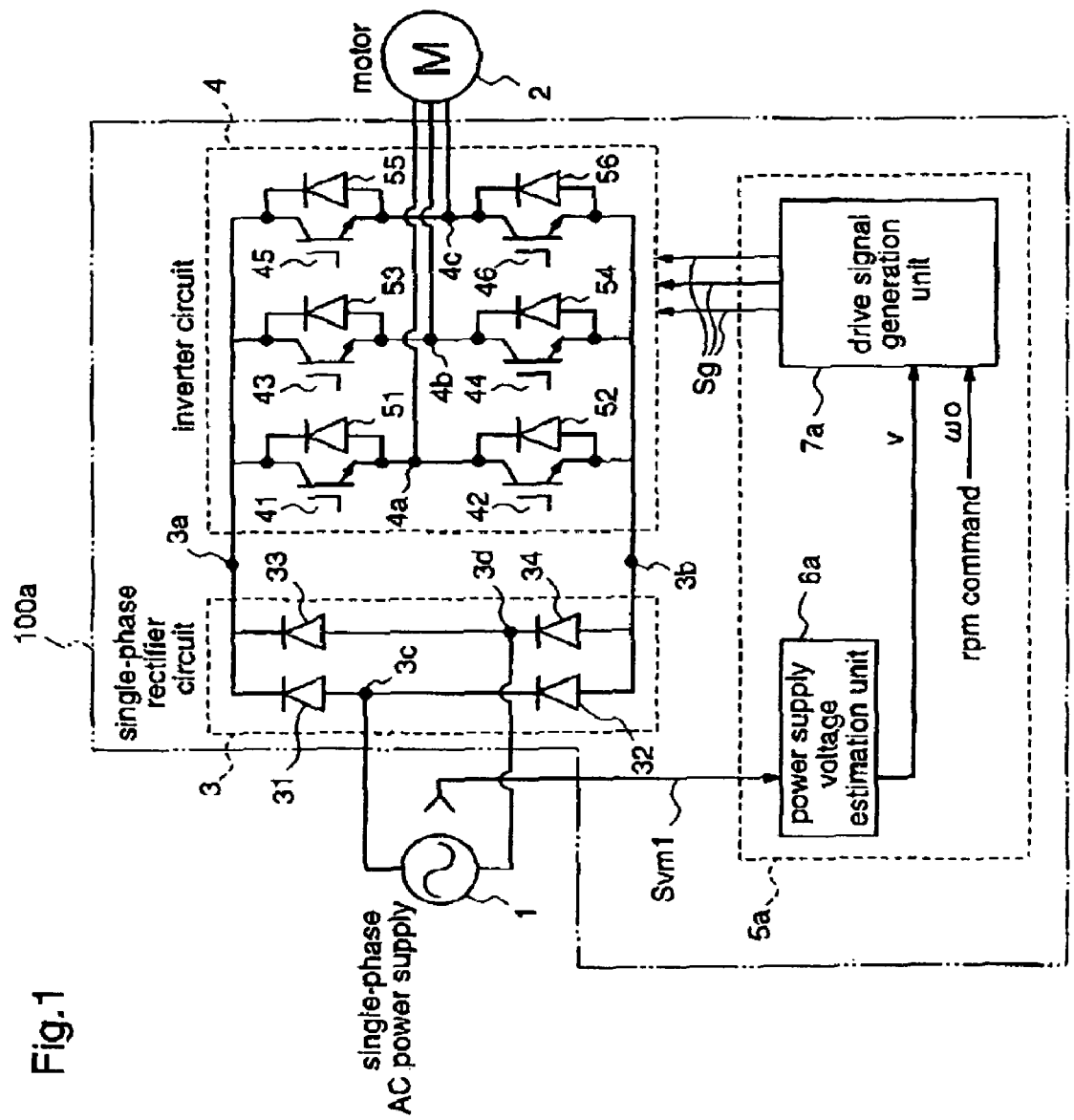
FIG. 1 is a block diagram for explaining a motor driving apparatus according to a first embodiment of the present invention.

FIG. 1 is a block diagram for explaining a motor driving apparatus according to a first embodiment of the present invention.

A motor driving apparatus 100a according to the first embodiment has an input connected to a single-phase AC power supply 1, and drives a motor 2 at a desired frequency by using a three-phase DC output. In this first embodiment, the motor 2 may be any of an induction motor, a DC brushless motor, a reluctance motor, and the like. Further, it is assumed that the motor driving apparatus 100a drives a motor of a compressor for circulating a refrigerant, which is mounted on an air conditioner.

Hereinafter, a single-phase rectifier circuit 3, an inverter circuit 4, and an inverter control unit 5a, which are constituents of the motor driving apparatus 100a, will be described in detail.

The single-phase rectifier circuit 3 receives an output of the single-phase AC power supply 1, and supplies a DC voltage to the inverter circuit 4. The inverter circuit 4 converts the DC voltage outputted from the single-phase rectifier circuit 3 into a three-phase AC voltage on the basis of a drive signal Sg outputted from the inverter control unit 5a, and outputs the three-phase AC voltage and three-phase AC current to the motor 2.

The single-phase rectifier circuit 3 and the inverter circuit 4 are identical to those of the conventional motor driving apparatus 100. The single-phase rectifier circuit 3 comprises rectifier diodes 31 to 34. The inverter circuit 4 comprises switching elements 41 to 46, and diodes 51 to 56 that are connected in inverse-parallel to the respective switching elements.

Although the inverter circuit 4 is a circuit of a three-phase full bridge structure, the inverter circuit 4 may be of any circuit structure so long as it can output a three-phase AC voltage and current. For example, the inverter circuit 4 may be constructed by using a capacitor for a portion corresponding to one phase of the three-phase AC outputs. Further, the inverter circuit 4 may include snubber circuits added to the respective switching elements.

The inverter control unit 5a supplies the inverter circuit 4 with a drive signal Sg so as to drive the motor 2 at a rpm (revolutions per minute) that is desired by a user, and the inverter control unit 5a comprises a power supply voltage estimation unit 6a and a drive signal generation unit 7a.

The power supply voltage estimation unit 6a estimates the waveform of the power supply voltage v on the basis of a monitor signal Svm1 of the output voltage (hereinafter also referred to as a power supply voltage) of the single-phase AC power supply 1, and outputs a signal indicating the waveform of the power supply voltage v. In this first embodiment, the power supply voltage estimation unit 6a employs a circuit structure for directly detecting the AC voltage (power supply voltage) outputted from the single-phase AC power supply 1 by using resistance-type potential division or the like, thereby to obtain the waveform of the output voltage. More specifically, an analog value obtained by detecting the power supply voltage is AD converted by using a microcomputer or the like to output a signal indicating the power supply voltage. Further, when it is necessary to insulate the single-phase AC power supply 1 from the power supply voltage estimation unit 6a, an insulation circuit such as a transformer may be used as the power supply voltage estimation unit 6a.

The drive signal generation unit 7a controls the inverter circuit 4 on the basis of a rpm command ωo supplied from the outside of the motor driving apparatus 100a (i.e., externally supplied), and the estimated waveform of the power supply voltage v. To be specific, the drive signal generation unit 7a calculates a PWM (Pulse-Width Modulation) width of a pulse signal for turning on the respective switching elements 41 to 46 of the inverter circuit 4, and outputs the pulse signal having the calculated PWM width to the inverter circuit 4 as a drive signal Sg so that a three-phase current is supplied to the motor 2. Further, the drive signal generation unit 7a performs a first control for decreasing the current (motor driving current) supplied to the motor 2 in an operation section where the power supply voltage v changes from zero to peak, and a second control for increasing the current (motor driving current) supplied to the motor 2 in an operation section where the power supply voltage v changes from peak to zero. The drive signal generation unit 7a may perform either of the first control and the second control. Further, in this first embodiment, the operation section where the power supply voltage v changes from zero to peak, which is a target of the first control, includes both of an operation section where the power supply voltage v changes from zero to positive peak, and an operation section where the power supply voltage v changes from zero to negative peak. Further, the operation section where the power supply voltage v changes from peak to zero, which is a target of the second control, includes both of an operation section where the power supply voltage v changes from positive peak to zero, and an operation section where the power supply voltage v changes from negative peak to zero. By controlling the motor driving current in this way, the waveform of the current that flows from the single-phase AC power supply 1 to the motor driving apparatus 100a becomes favorable, thereby improving the input power factor.

As a specific method for increasing (or decreasing) the motor driving current, the voltage supplied to the motor 2 may be increased (or decreased) by increasing (or decreasing) the PWM width of the pulse signal. Alternatively, the current that actually flows into the motor 2 is detected, and the PWM width of the pulse signal is controlled to increase (or decrease) the value of the detected current.

Next, the operation of the motor driving apparatus 100a will be described.

The AC voltage outputted from the single-phase AC power supply 1 is rectified by the single-phase rectifier circuit 3, and a DC voltage is output from the single-phase rectifier circuit 3 to the inverter circuit 4. In the inverter circuit 4, the respective switching elements 41 to 46 are turned on/off by the drive signal Sg supplied from the drive signal generation unit 7a, and the motor driving current is output from the inverter circuit 4. The motor 2 is driven by the motor driving current outputted from the inverter circuit 4.

At this time, in the power supply estimation unit 6a, the waveform of the power supply voltage v is estimated on the basis of the monitor signal Svm1 of the power supply voltage, and a signal indicating the waveform of the power supply voltage v is output to the drive signal generation unit 7a.

In the drive signal generation unit 7a, a pulse signal to be applied to the gates of the switching elements 41 to 46 as the drive signal Sg is generated on the basis of the rpm command ωo supplied from the outside, and the waveform of the power supply voltage v.

Hereinafter, the fundamental operation of the drive signal generation unit 7a will be described.

When the motor 2 is an induction motor, the drive signal generation unit 7a calculates a voltage level which is required for driving the motor on the basis of the characteristics of the inductor motor, and creates a reference sinusoidal waveform having an amplitude level that matches the calculated voltage level, and a frequency that matches the command rpm. Then, the drive signal generation unit 7a compares the reference sinusoidal waveform with the triangle wave of the switching carrier indicating the operation frequency of the switching elements, thereby to determine the PWM width of the pulse signal. As the characteristics of the induction motor, a VF function indicating the relationship between the rpm of the motor and the driving voltage level is employed.

When the motor 2 is a DC brushless motor, the drive signal generation unit 7a performs current minor control to the inverter circuit 4 on the basis of the phase of the motor, and the three-phase driving current supplied to the motor, thereby to determine the PWM width of the pulse signal. That is, the drive signal generation unit 7a determines the PWM width of the pulse signal so that the waveform of the three-phase driving current becomes a current waveform based on the detected phase of the motor, on the basis of the output of a phase detection unit (not shown) for detecting the phase of the motor, and the output of a driving current detection unit (not shown) for detecting the motor driving current.

Generally, the fundamental operation of the drive signal generation unit 7a varies depending on the type of the motor 2 to be driven. In this first embodiment, the fundamental operation of the drive signal generation unit 7a may correspond to any type of motor.

Then, the drive signal generation unit 7a performs the first control for adjusting the PWM width of the pulse signal to decrease the current (motor driving current) supplied to the motor 2 in the operation section where the power supply voltage v changes from zero to peak, and the second control for adjusting the PWM width of the pulse signal to increase the current (motor driving current) supplied to the motor 2 in the operation section where the power supply voltage v changes from peak to zero.

The reason why the input power factor of the motor driving apparatus is improved by controlling the motor driving current is as follows.

The current that flows from the single-phase AC power supply 1 to the motor driving apparatus 100a includes, not only the current to be consumed by the motor 2, but also a charging/discharging current to/from a parasitic capacitor that exists in the inverter circuit 4, or a capacitor that constitutes a snubber circuit for reducing switching noise, or a capacitor that is connected to the input end of the inverter circuit 4 to smooth the input voltage. That is, when the power supply voltage changes from zero to peak, a charging current flows from the single-phase AC power supply 1 to the capacitor. Conversely, when the power supply voltage changes from peak to zero, a discharging current flows from the capacitor. When the current consumed by the motor 2 is equal to or smaller than the charging/discharging current, the charging/discharging current occupies a great part of the current that flows from the single-phase AC power supply 1 to the motor driving apparatus 100, which causes distortion in the waveform of the input current to the motor driving apparatus.

So, in this first embodiment, the current supplied from the single-phase AC power supply 1 to the motor driving apparatus 100a is varied, considering the charging/discharging current, whereby the waveform of the current that flows from the single-phase AC power supply 1 to the inverter circuit 4 can be improved.

Next, changes in the current waveform outputted from the single-phase AC power supply 1 when the motor driving apparatus 100a according to the first embodiment is used will be described with respect to the case where the motor 2 is a DC brushless motor.

Figure 2A:
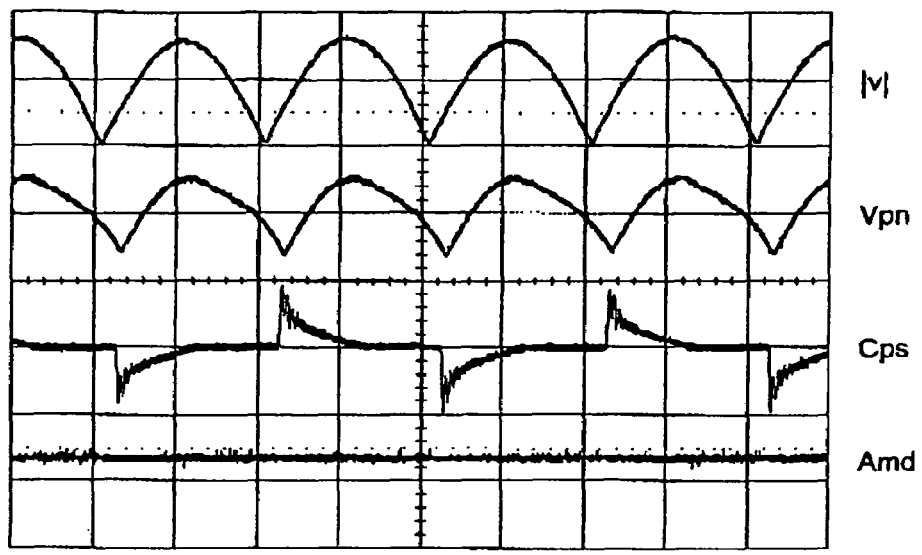
FIG. 2(a) is a diagram for explaining the operation of the motor driving apparatus according to the first embodiment, illustrating current waveforms and voltage waveforms in a case where the motor driving current is not controlled.
Figure 2B:
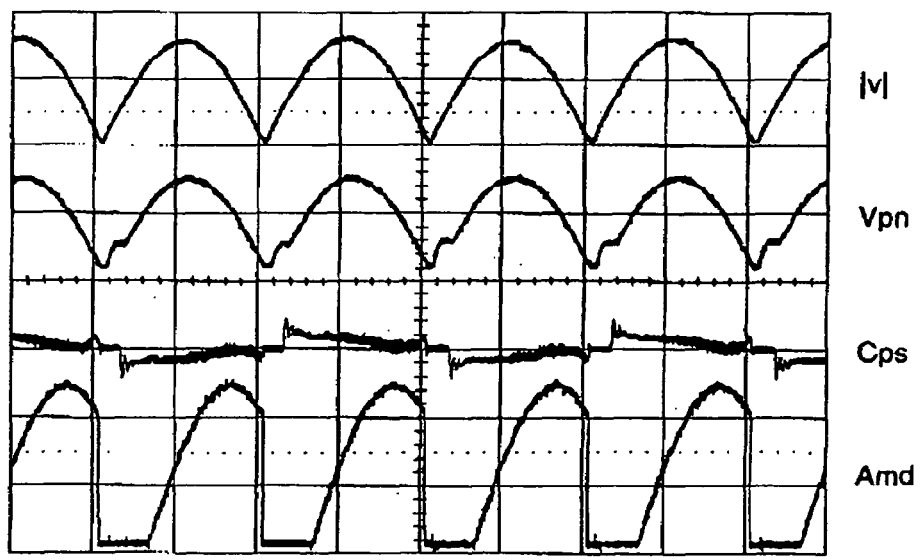
FIG. 2(b) is a diagram for explaining the operation of the motor driving apparatus according to the first embodiment, illustrating current waveforms and voltage waveforms in a case where the motor driving current is controlled.

FIG. 2(b) shows voltage waveforms and current waveforms in the case where the motor driving current is controlled according to the first embodiment, and FIG. 2(a) shows voltage waveforms and current waveforms in the case where the motor driving current is not controlled.

In FIGS. 2(a) and 2(b), |v| is the absolute value of the voltage of the single-phase AC power supply 1, Vpn is the input voltage to the inverter circuit 4, Cps is the output current from the single-phase AC power supply 1, and Amd is the amplitude value of the input current to the motor 2.

It is evident from FIG. 2(b) that, in the motor driving apparatus 100a of the first embodiment, the amplitude value Amd of the current inputted to the motor 2 decreases in the operation section where the charging current flows into the capacitor and the power supply voltage v changes from zero to peak, and increases in the operation section where the discharging current flows from the capacitor and the power supply voltage v changes from peak to zero.

As a result, the waveform of the input voltage Vpn of the inverter circuit 4 is approximated to the waveform of the absolute value |v| of the output voltage of the single-phase AC power supply 1, whereby the pulse width of the output current Cps from the single-phase AC power supply 1 is increased, resulting in the improved waveform of the input voltage Vpn.

In this first embodiment, the input power factor of the motor driving apparatus 100a is improved from 0.4 to 0.9.

As described above, the motor driving apparatus 100a according to the first embodiment is provided with the single-phase rectifier circuit 3 that is connected to the single-phase AC power supply 1, the inverter circuit 4 that is connected to the single-phase rectifier circuit 3 and outputs a current and a voltage to the motor 2, and the inverter control unit 5a for controlling the inverter circuit 4. The inverter control unit 5a decreases the current (motor driving current) supplied to the motor 2 in the operation section where the power supply voltage v changes from zero to peak, and increases the current (motor driving current) in the operation section where the power supply voltage v changes from peak to zero, whereby the current outputted from the single-phase AC power supply 1 is leveled.

To be specific, in the section where the single-phase AC power supply rises from zero to peak, not only the current to be supplied to the motor 2 but also the charging current to the parasitic capacitor flow from the single-phase AC power supply 1 to the inverter circuit 4. However, increase in the current that flows from the single-phase AC power supply 1 to the inverter circuit 4 can be minimized by decreasing the amount of current to be supplied to the motor 2 in this section. Conversely, in the section where the power supply voltage falls from peak to zero, the current to be supplied to the motor 2 decreases, and the discharging current flows from the parasitic capacitor in the inverter circuit 4, whereby the current that flows from the single-phase AC power supply 1 to the inverter circuit 4 decreases. However, decrease in the current that flows from the single-phase AC power supply 1 to the inverter circuit 4 can be minimized by increasing the current to be supplied to the motor in this section. As a result, the current outputted from the single-phase AC power supply 1 can be leveled.

Further, since the value of the output current of the inverter circuit 4 is varied according to the power supply voltage estimated by the power supply voltage estimation unit 6a, control of the motor driving current or motor driving voltage can be realized by a relatively simple construction as compared with the conventional power-factor improvement method (first prior art) which modulates the motor driving current by the output waveform of the AC power supply.

Further, since the output current of the inverter circuit 4 is controlled according to the estimated power supply voltage, control of the inverter circuit 4 is carried out considering the regenerative current from the motor to the inverter circuit 4, in contrast to the conventional power-factor improvement method (second prior art) which controls the phase of the motor driving voltage according to the induced voltage of the motor, thereby avoiding reduction in the motor driving efficiency or degradation in the input power factor due to the regenerative current.

As a result, a motor driving apparatus satisfying the IEC harmonics standards, that can effectively inhibit reduction in the power factor while maintaining a high efficiency of motor driving, can be realized with a relatively simple circuit construction.

In this first embodiment, as shown in FIG. 2(b), the waveform of the amplitude value Amd of the current inputted to the motor 2 is such that the waveform of a sinusoidal wave in a section where the phase is 0 to $\pi$ is shifted to a section where the phase is $\pi$ to $2\pi$. However, the waveform of the amplitude value Amd of the current to the motor 2 is not restricted to that shown in FIG. 2(b), and it may be a rectangle wave or a triangle wave.

Further, while the inverter control unit 5a directly controls the current supplied to the motor in this first embodiment, the inverter control unit 5a may control the voltage supplied to the motor.

For example, the inverter control unit 5a may perform either of a first control for decreasing the voltage (motor driving voltage) to be supplied to the motor 2 in the operation section where the power supply voltage v changes from zero to peak, and a second control for increasing the voltage (motor driving voltage) in the operation section where the power supply voltage v changes from peak to zero. In this case, the same effects as mentioned above can also be achieved.

Furthermore, the operation section where the power supply voltage v changes from zero to peak, which is the target of the first control, may be either a section where the power supply voltage v changes from zero to positive peak or a section where the power supply voltage v changes from zero to negative peak. Similarly, the operation section which is the target of the second control may be either a section where the power supply voltage v changes from positive zero to zero or a section where the power supply voltage v changes from negative peak to zero.

Second Embodiment

Figure 3:
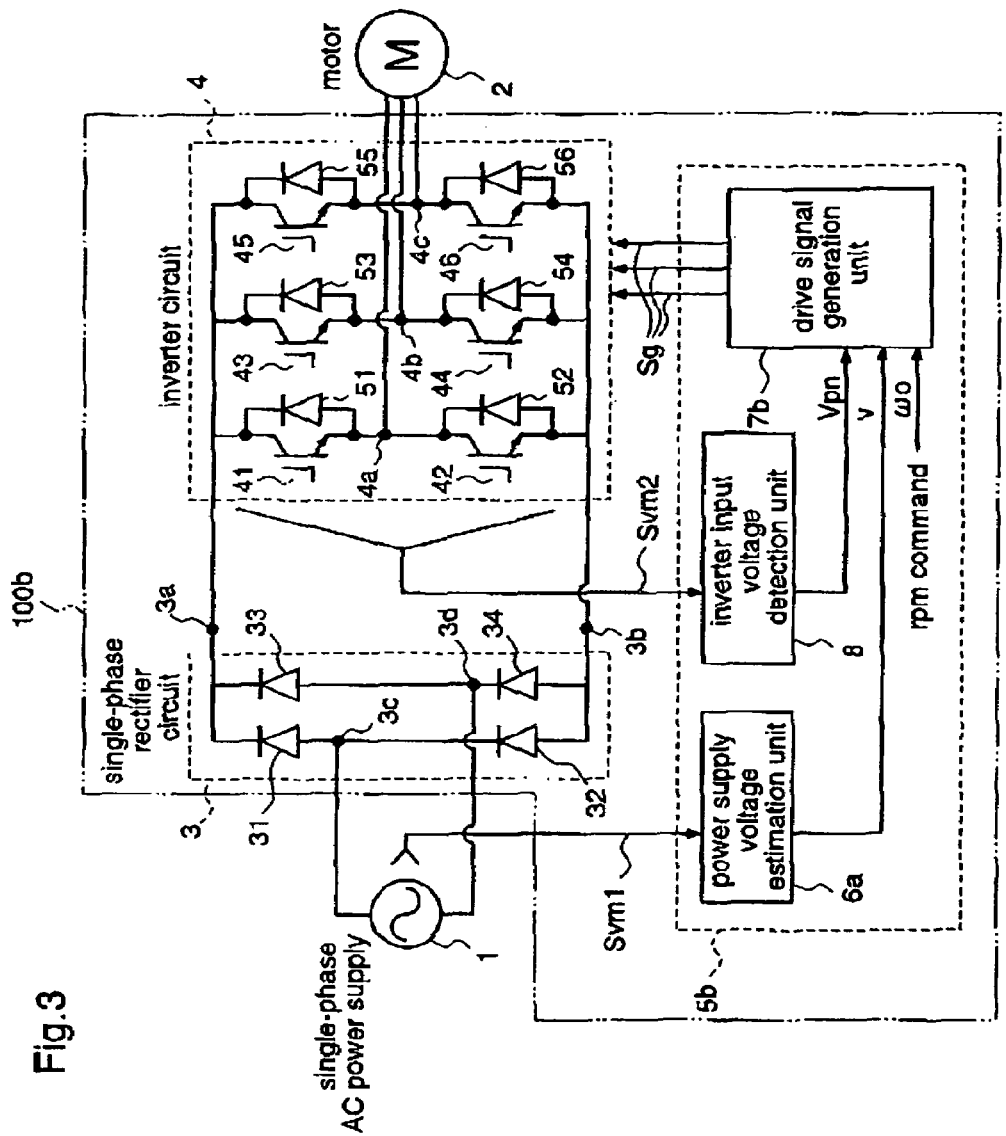
FIG. 3 is a block diagram for explaining a motor driving apparatus according to a second embodiment of the present invention.

FIG. 3 is a block diagram for explaining a motor driving apparatus according to a second embodiment of the present invention.

A motor driving apparatus 100b according to the second embodiment has an input connected to a single-phase AC power supply 1, and drives a motor 2 at a required frequency by using a three-phase AC output. The motor driving apparatus 100b includes a single-phase rectifier circuit 3 connected to the single-phase AC power supply 1, an inverter circuit 4 that is connected to the single-phase rectifier circuit 3 and outputs a driving current and a driving voltage to the motor 2, and an inverter control unit 5b for controlling the inverter circuit 4.

The single-phase rectifier circuit 3 and the inverter circuit 4 included in the motor driving apparatus 100b according to the second embodiment are identical to those of the motor driving apparatus 100a according to the first embodiment.

Hereinafter, the inverter control unit 5b of the motor driving apparatus 100b will be described in detail.

The inverter control unit 5b supplies the inverter circuit 4 with a drive signal Sg so as to drive the motor 2 at a rpm desired by the user. The inverter control unit 5b comprises a power supply voltage estimation unit 6a, an inverter input voltage detection unit 8, and a drive signal generation unit 7b.

The power supply voltage estimation unit 6a is identical to that of the motor driving apparatus 10a according to the first embodiment.

The inverter input voltage detection unit 8 directly detects the voltage inputted to the inverter circuit 4, as an analog value, by potential division using resistors, and converts the detected analog value into a digital value by using a microcomputer or the like. However, the method of detecting the input voltage by the inverter input voltage detection unit 8 is not restricted thereto.

The drive signal generation unit 7b calculates, from a rpm command ωo, the PWM width of a pulse signal for turning on the respective switching elements 41 to 46 of the inverter circuit 4, and outputs the pulse signal having the calculated PWM width to the inverter circuit 4 as a drive signal Sg.

Further, the drive signal generation unit 7b compares the absolute value |v| of the power supply voltage v estimated by the power supply voltage estimation unit 6a with the inverter input voltage Vpn detected by the inverter input voltage detection unit 8, and determines the PWM width so that the waveform of the inverter input voltage Vpn becomes equal to the waveform of the absolute value |v| of the power supply voltage.

To be specific, the drive signal generation unit 7b changes the PWM width in the direction of increasing the current to be applied to the motor 2 when the level of the inverter input voltage Vpn takes a value which is larger than the absolute value |v| of the power supply voltage. On the other hand, the drive signal generation unit 7b changes the PWM width in the direction of decreasing the current to be applied to the motor 2 when the level of the inverter input voltage Vpn takes a value which is smaller than the absolute value |v| of the power supply voltage. Further, when the inverter input voltage Vpn is equal to the absolute value |v| of the power supply voltage, the drive signal generation unit 7b maintains the PWM width that depends on the rpm command. When the inverter input voltage Vpn is equal to the absolute value |v|, the drive signal generation circuit 7b may decrease the current to be applied to the motor 2 by a predetermined amount. The reason is as follows. When the inverter input voltage Vpn takes a value which is larger than the absolute value |v| of the power supply voltage, an increase in the current to be supplied to the motor 2 results in an increase in the torque that occurs in the motor 2, and the rpm of the motor becomes higher than the command rpm. Consequently, the whole current value must be decreased to lower the rpm.

The amount of increase or decrease in the current to be applied to the motor 2 can be easily determined from a difference between the inverter input voltage Vpn and the absolute value |v| of the power supply voltage, and the average current that actually flows in the motor 2. However, the amount of increase or decrease in the current to be applied to the motor 2 may be determined by feeding the difference between the inverter input voltage Vpn and the absolute value |v| of the power supply voltage back to the amount of increase or decrease in the current applied to the motor 2 so that the waveform of the inverter input voltage Vpn becomes equal to that of the absolute value |v| of the power supply voltage.

Next, the operation of the motor driving apparatus 100b will be described.

In the motor driving apparatus 100b according to the second embodiment, the single-phase rectifier circuit 3 and the inverter circuit 4 operate in a manner similar to those of the motor driving apparatus 100a according to the first embodiment, and the motor 2 is driven by the output of the inverter circuit 4.

At this time, in the power supply estimation unit 6a, the waveform of the power supply voltage v is estimated on the basis of the monitor signal Svm1 of the power supply voltage, and a signal indicating this waveform is output to the drive signal generation unit 7b. Further, in the inverter input voltage detection unit 8, the inverter input voltage Vpn is detected on the basis of the monitor signal Svm2 of the input voltage of the inverter circuit 4, and a signal indicating this inverter input voltage Vpn is output to the drive signal generation unit 7b.

In the drive signal generation unit 7a, a pulse signal to be applied to the gates of the respective switching elements 41 to 46 is generated as the drive signal Sg on the basis of the rpm command ωo supplied from the outside, the waveform of the power supply voltage v, and the inverter input voltage Vpn.

When calculating the PWM width of the drive signal Sg, the drive signal generation unit 7b compares the absolute value |v| of the power supply voltage v estimated by the power supply voltage estimation unit 6a with the inverter input voltage Vpn detected by the inverter input voltage detection unit 8, and determines the PWM width so that the waveform of the inverter input voltage Vpn becomes equal to the waveform of the absolute value |v| of the power supply voltage.

To be specific, when the level of the inverter input voltage Vpn takes a value which is larger than the absolute value |v| of the power supply voltage, the drive signal generation unit 7b changes the PWM width to increase the current to be applied to the motor 2. On the other hand, when the level of the inverter input voltage Vpn takes a value which is smaller than the absolute value |v| of the power supply voltage, the drive signal generation unit 7b changes the PWM width to decrease the current to be applied to the motor 2. Further, when the inverter input voltage Vpn is equal to the absolute value |v| of the power supply voltage, the drive signal generation unit 7b maintains the PWM width that depends on the rpm command.

Next, a description will be given of a mechanism by which the waveform of the current that flows from the single-phase AC power supply 1 to the motor driving apparatus 100b is improved by controlling the motor driving current and thereby improving the power factor.

Initially, a description will be given of a case where control of the motor driving current on the basis of the result of comparison between the inverter input voltage Vpn and the absolute value |v| of the power supply voltage is not carried out.

Since the single-phase rectifier circuit 3 exists between the single-phase AC power supply 1 and the inverter circuit 4, when the input voltage of the inverter circuit 4 is higher than the absolute value of the output voltage of the single-phase AC power supply 1, no current flows to the single-phase AC power supply 1, resulting in an non-energized section where no current flows from the single-phase AC power supply 1 to the motor driving apparatus 100b, i.e., the output current of the power supply is zero. On the other hand, when the input voltage of the inverter circuit 4 is lower than the absolute value of the power supply voltage, not only the motor driving current but also the charging current of the parasitic capacitance on the inverter circuit 4 input side flow from the single-phase AC power supply 1 to the inverter circuit 4, whereby a current larger than the current which is required for driving the motor flows in the rectifier circuit 3. As a result, the waveform of the output current from the power supply is distorted, leading to a reduction in the input power factor of the motor driving apparatus 100b.

Next, a description will be given of a case where control of the motor driving current on the basis of the result of comparison between the inverter input voltage Vpn and the absolute value |v| of the power supply voltage is carried out.

In this second embodiment, during the period when the input voltage Vpn of the inverter circuit 4 is higher than the absolute value |v| of the voltage v of the single-phase AC power supply 1 and thereby no current flows into the rectifier circuit 3, the drive signal generation unit 7b changes the PWM width of the drive signal Sg to be output to the inverter circuit 4 in the direction of increasing the current to be supplied to the motor 2. Therefore, the level of the inverter input voltage Vpn is lowered, and the energized period of the rectifier circuit 3 can be increased.

On the other hand, during the period when the inverter input voltage Vpn is lower than the absolute value of the power supply voltage and thereby a current larger than the current which is required for driving the motor flows into the rectifier circuit 3, the drive signal generation unit 7b changes the PWM width of the drive signal Sg in the direction of decreasing the motor driving current. Therefore, the level of the inverter input voltage Vpn is increased, thereby avoiding the situation where a current which is larger than the current required for driving the motor flows into the rectifier circuit 3.

As a result, the waveform of the current supplied from the power supply to the motor driving apparatus is favorably corrected, whereby the input power factor of the motor driving apparatus is improved.

As described above, the motor driving apparatus 100b according to the second embodiment is provided with the single-phase rectifier circuit 3 that is connected to the single-phase AC power supply 1, the inverter circuit 4 that is connected to the single-phase rectifier circuit 3 and outputs a current and a voltage to the motor 2, and the inverter control unit 5b for controlling the inverter circuit 4. The inverter control unit 5b compares the absolute value |v| of the power supply voltage v estimated by the power supply voltage estimation unit 6a with the inverter input voltage Vpn detected by the inverter input voltage detection unit 8, and changes the PWM width of the drive signal Sg in the direction of increasing or decreasing the motor current so that the waveform of the inverter input voltage Vpn becomes equal to the waveform of the absolute value |v| of the power supply voltage. Therefore, the input power factor can be improved without modulating the waveform of the motor driving current by using the waveform of the output voltage of the AC power supply or performing advancing control of the motor driving voltage according to the induced voltage of the motor, resulting in a highly efficient motor driving apparatus that clears the IEC harmonics standards.

In this second embodiment, the drive signal generation unit 7b performs the first control for changing the PWM width in the direction of increasing the current to be applied to the motor 2 when the level of the inverter input voltage Vpn takes a value which is larger than the absolute value |v| of the power supply voltage, and performs the second control for changing the PWM width in the direction of decreasing the current to be applied to the motor 2 when the level of the inverter input voltage Vpn takes a value which is smaller than the absolute value |v| of the power supply voltage. However, the drive signal generation unit 7b may perform either of the first control and the second control.

Further, in this second embodiment, the inverter control unit 5b directly controls the current to be supplied to the motor, which is the output current of the inverter circuit 4. However, the inverter control unit 5b may control the voltage supplied to the motor, which is the output voltage of the inverter circuit.

For example, the motor driving apparatus 100b may control the voltage supplied to the motor 2 so that the waveform of the input voltage Vpn of the inverter circuit 4 becomes equal to the waveform of the absolute value |v| of the output voltage of the single-phase AC power supply 1. In this case, the same effects as described above can also be achieved.

Third Embodiment

Figure 4:
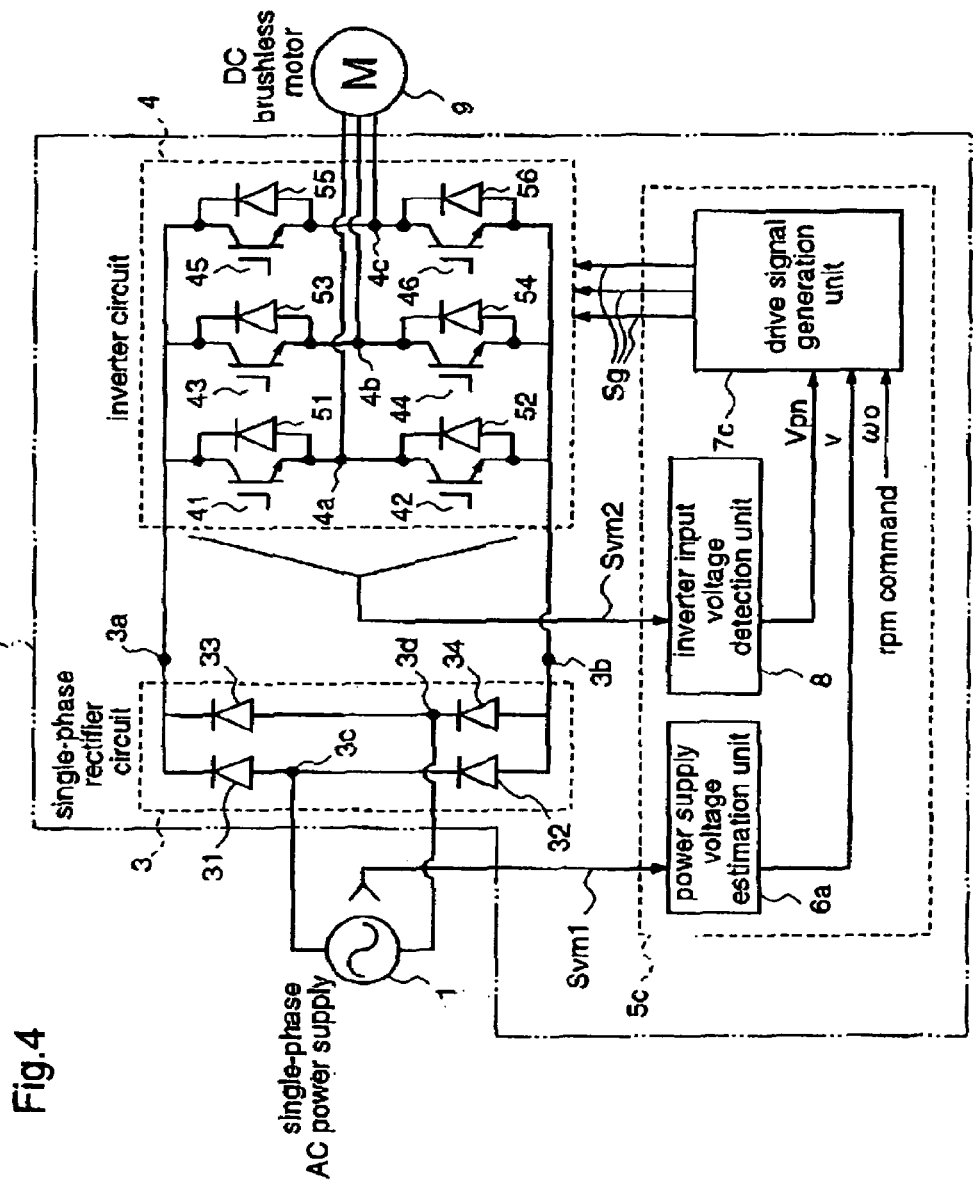
FIG. 4 is a block diagram for explaining a motor driving apparatus according to a third embodiment of the present invention.

FIG. 4 is a block diagram for explaining a motor driving apparatus according to a third embodiment of the present invention.

A motor driving apparatus 100c according to the third embodiment has an input connected to a single-phase AC power supply 1, and drives a DC brushless motor 9 by a three-phase AC output at a required frequency.

Hereinafter, a single-phase rectifier circuit 3, an inverter circuit 4, and an inverter control circuit 5c that constitute the motor driving apparatus 100c will be described in detail.

The single-phase rectifier circuit 3 and the inverter circuit 4 are identical to those of the motor driving apparatus 100b according to the second embodiment.

The inverter control unit 5c supplies the inverter circuit 4 with a drive signal Sg so that the DC brushless motor 9 is driven at a rpm required by the user. The inverter control unit 5c comprises a power supply voltage estimation unit 6a, an inverter input voltage detection unit 8, and a drive signal generation unit 7c.

The power supply voltage estimation unit 6a and the inverter input voltage detection unit 8 are identical to those of the motor driving apparatus 100b according to the second embodiment.

The drive signal generation unit 7c calculates a PWM width of a pulse signal for turning on/off the respective switching elements 41 to 46 of the inverter circuit 4 on the basis of a rpm command ωo supplied from the outside, and outputs the pulse signal having the calculated PWM width to the inverter circuit 4 as a drive signal Sg.

Further, the drive signal generation unit 7c compares the absolute value |v| of the power supply voltage v estimated by the power supply voltage estimation unit 6a with the inverter input voltage Vpn detected by the inverter input voltage detection unit 8, and determines the PWM width so that the waveform of the inverter input voltage Vpn becomes equal to the waveform of the absolute value |v| of the power supply voltage v.

To be specific, when the level of the inverter input voltage Vpn takes a value which is larger than the absolute value |v| of the power supply voltage, the drive signal generation unit 7c changes the PWM width in the direction of advancing the phase of the current supplied to the DC brushless motor 9.

The reason is as follows. When the inverter input voltage Vpn takes a value which is larger than the absolute value |v| of the power supply voltage, the induced voltage of the DC brushless motor 9 becomes higher than the voltage outputted from the inverter circuit 4, and a regenerative current flows, and conversely, a parasitic capacitance existing at the input side of the inverter circuit 4, and a capacitor existing in a snubber circuit or a capacitor connected for smoothing are charged, resulting in a possibility that the phase of the motor driving current is delayed.

On the other hand, when the level of the inverter input voltage Vpn takes a value which is smaller than the absolute value |v| of the power supply voltage, the drive signal generation unit 7c changes the PWM width in the direction of delaying the phase of the current supplied to the DC brushless motor 9.

The reason is as follows. When the inverter input voltage Vpn takes a value which is smaller than the absolute value |v| of the power supply voltage, the induced voltage of the DC brushless motor 9 becomes lower than the voltage outputted from the inverter circuit 4, resulting in a possibility that the phase of the motor driving current is advanced.

Further, when the inverter input voltage Vpn takes a value which is equal to the absolute value |v| of the power supply voltage, the drive signal generation unit 7c maintains the PWM width that depends on the rpm command, so that the phase of the current supplied to the DC brushless motor is not changed.

The amount of phase control for the current supplied to the DC brushless motor 9, i.e., the amount of phase advance or phase delay, can be easily determined from a difference between the inverter input voltage Vpn and the absolute value |v| of the power supply voltage, and the average current that actually flows in the DC brushless motor. However, the amount of phase control for the current supplied to the DC brushless motor 9 may be determined by feeding the difference between the inverter input voltage Vpn and the absolute value |v| of the power supply voltage back to the phase control amount so that the waveform of the inverter input voltage Vpn becomes equal to that of the absolute value |v| of the power supply voltage.

Next, the operation of the motor driving apparatus 100c will be described.

In the motor driving apparatus 100c according to the third embodiment, the operations of the single-phase rectifier circuit 3 and the inverter circuit 4 are identical to those of the motor driving apparatus 100a according to the first embodiment, and the motor 2 is driven by the output of the inverter circuit 4.

At this time, in the inverter control unit 5c, the waveform of the power supply voltage v is estimated by the power supply voltage estimation unit 6a, and the inverter input voltage Vpn is detected by the inverter input voltage detection unit 8. Then, in the drive generation unit 7c, a pulse signal to be applied to the gates of the switching elements 41 to 46 is generated as the drive signal Sg on the basis of the rpm command ωo supplied from the outside, the waveform of the power supply voltage v, and the inverter input voltage Vpn.

That is, when the level of the inverter input voltage Vpn takes a value which is larger than the absolute value |v| of the power supply voltage, the drive signal generation unit 7c changes the PWM width in the direction of advancing the phase of the current supplied to the DC brushless motor 9. On the other hand, when the level of the inverter input voltage Vpn takes a value which is smaller than the absolute value |v| of the power supply voltage, the drive signal generation unit 7c changes the PWM width in the direction of delaying the phase of the current supplied to the DC brushless motor 9. Further, when the level of the inverter input voltage Vpn is equal to the absolute value |v| of the power supply voltage, the drive signal generation unit 7c maintains the PWM width that depends on the rpm command, so that the phase of the current supplied to the DC brushless motor 9 is not varied.

By controlling the current supplied to the motor in this way, the waveform of the current flowing from the single-phase AC power supply 1 into the motor driving apparatus 100c becomes favorable, resulting in an improved power factor.

The mechanism of improving the power factor will be briefly described. When a regenerative current flows from the DC brushless motor 9 into the inverter circuit 4, the parasitic capacitance at the input side of the inverter circuit 4 is charged and becomes higher than the absolute value of the voltage of the single phase AC power supply 1 placed before the rectifier circuit 3. Therefore, it is considered that a regenerative current flows when the input voltage of the inverter circuit 4 is higher than the absolute value of the power supply voltage. Accordingly, during the period when a regenerative current is assumed to be generated, the drive signal generation unit 7c advances the phase so as to increase the current that drives the DC brushless motor 9. Thereby, the induced voltage of the DC brushless motor 9 decreases, and the regenerative current that might brake the DC brushless motor 9 decreases, whereby the torque that occurs in the DC brushless motor 9 increases, resulting in an increase in motor driving efficiency. Further, when the regenerative current is decreased, the waveform of the input voltage of the inverter circuit 4 becomes approximately equal to the waveform of the absolute value of the power supply voltage, whereby the energization period in the rectifier circuit 3 that exists between the single-phase AC power supply 1 and the inverter circuit 4 can be increased.

On the other hand, it is considered that a current which is larger than the current required for driving the motor flows in the rectifier circuit 3 when the input voltage of the inverter circuit 4 is lower than the absolute value of the power supply voltage. Accordingly, during the period when a current which is larger than the required current flows, the drive signal generation unit 7c delays the phase so as to decrease the current that drives the DC brushless motor 9. Therefore, the level of the inverter input voltage Vpn is increased, thereby avoiding the situation where a current which is larger than the current required for driving the motor flows into the rectifier circuit 3.

As a result, the waveform of the current supplied from the power supply to the motor driving apparatus is favorably corrected, resulting in an improved input power factor of the motor driving apparatus.

Next, a description will be given of changes in the current waveform outputted from the single-phase AC power supply 1 in the case where the motor driving apparatus 100c according to the third embodiment is employed, taking an experimental example.

Figure 5A:
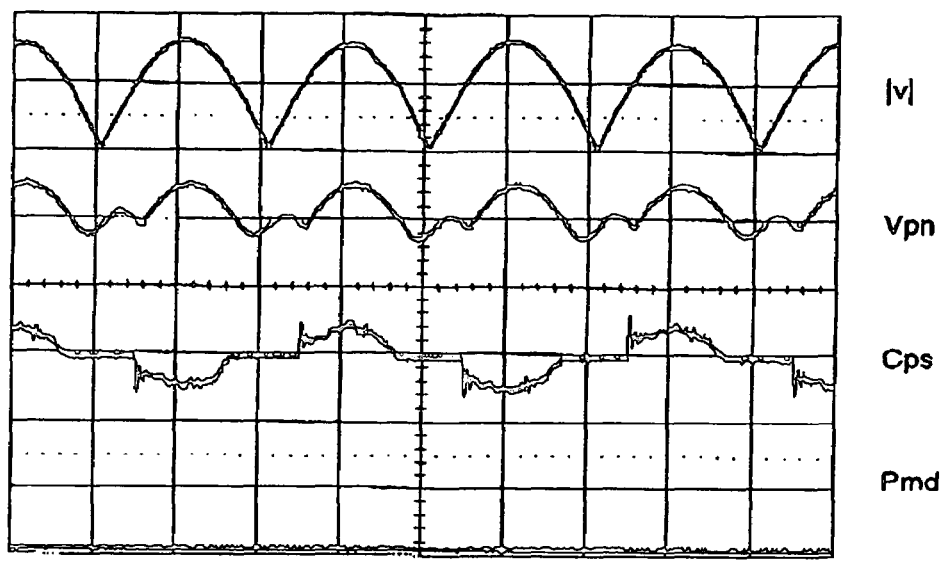
FIG. 5(a) is a diagram for explaining the operation of the motor driving apparatus according to the third embodiment, illustrating current waveforms and voltage waveforms in a case where the motor driving current is not controlled.
Figure 5B:
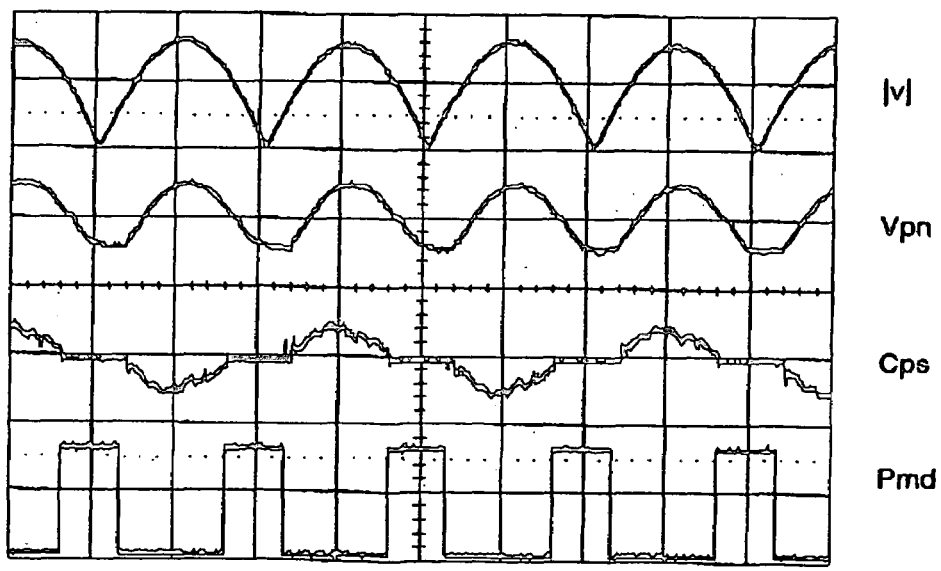
FIG. 5(b) is a diagram for explaining the operation of the motor driving apparatus according to the third embodiment, illustrating current waveforms and voltage waveforms in a case where the motor driving current is controlled.

FIG. 5(b) shows current waveforms and voltage waveforms in the case where the motor current is controlled according to the third embodiment, while FIG. 5(a) shows current waveforms and voltage waveforms in the case where the motor current is not controlled.

In these figures, |v| is the absolute value of the voltage of the single-phase AC power supply 1, Vpn is the input voltage of the inverter circuit 4, Cps is the current outputted from the single-phase AC power supply 1, and Pmd is the advance value of the current inputted to the DC brushless motor 9.

As is evident from FIGS. 5(b) and 5(a), in the motor driving apparatus 100c according to the third embodiment, the advance value Pmd of the current inputted to the DC brushless motor 9 is increased in the operation section where the input voltage Vpn of the inverter circuit 4 is higher than the absolute value of the voltage of the single-phase AC power supply 1. On the other hand, the advance value Pmd of the current inputted to the DC brushless motor 9 is decreased in the operation section where the input voltage Vpn of the inverter circuit 4 is lower than the absolute value |v| of the voltage of the single-phase AC power supply 1.

In FIG. 5(b), as compared with FIG. 5(a), the waveform of the input voltage Vpn of the inverter circuit 4 is approximately equal to the waveform of the absolute value |v| of the voltage of the single-phase AC power supply 1, and the pulse width of the output current from the single-phase AC power supply 1 is increased, whereby the waveform of the input voltage is improved.

In this third embodiment, the input power factor of the motor driving apparatus 100c is improved from 0.8 to 0.9.

As described above, the motor driving apparatus 100c according to the third embodiment is provided with the single-phase rectifier circuit 3 that is connected to the single-phase AC power supply 1, the inverter circuit 4 that is connected to the output of the single-phase rectifier circuit 3 and generates a driving current for the motor 2, and the inverter control unit 5c for controlling the inverter circuit 4. The inverter control unit 5c compares the absolute value |v| of the power supply voltage v estimated by the power supply voltage estimation unit 6a with the inverter input voltage Vpn detected by the inverter input voltage detection unit 8, and changes the PWM width in the direction of advancing or delaying the phase of the motor current so that the waveform of the inverter input voltage Vpn becomes equal to the waveform of the absolute value |v| of the power supply voltage. Therefore, the input power factor of the motor driving apparatus for driving the DC brushless motor is improved without modulating the waveform of the motor driving current according to the waveform of the power supply voltage or performing advancing control for the motor driving voltage according to the motor induced voltage, resulting in a motor driving apparatus of a relatively simple construction, that is able to efficiently drive a DC brushless motor, and clears the IEC harmonics standards.

While the advance value pmd of the current inputted to the brushless motor 9 is changed in the shape of a rectangle wave in this third embodiment as shown in FIG. 5(b), the waveform of the advance value of the motor current may be a sinusoidal wave or a triangle wave.

Further, while the inverter control unit controls the phase of the current supplied to the motor in this third embodiment, that is, the output current of the inverter circuit, the inverter control unit may control the phase of the voltage supplied to the motor, that is, the output voltage of the inverter circuit. In this case, the same effects as described above can also be achieved.

Furthermore, in this third embodiment, the drive signal generation unit 7c performs the first control for changing the PWM width in the direction of advancing the phase of the current supplied to the motor 2 when the level of the inverter input voltage Vpn takes a value which is larger than the absolute value |v| of the power supply voltage, and performs the second control for changing the PWM width in the direction of delaying the phase of the current supplied to the motor 2 when the level of the inverter input voltage Vpn takes a value which is smaller than the absolute value |v| of the power supply voltage. However, the drive signal generation unit 7c may perform either of the first control and the second control.

Fourth Embodiment

Figure 6:
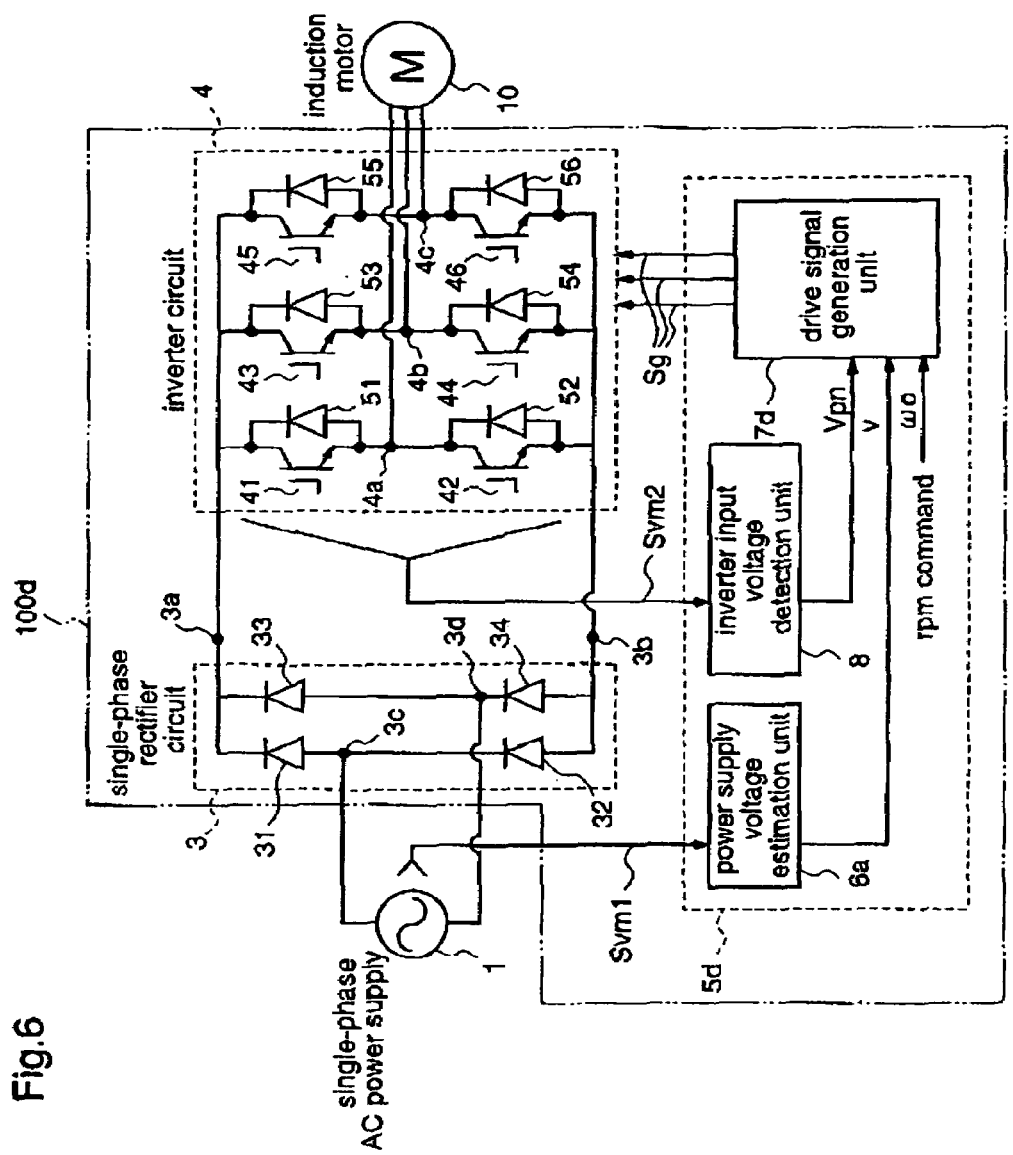
FIG. 6 is a block diagram for explaining a motor driving apparatus according to a fourth embodiment of the present invention.

FIG. 6 is a block diagram for explaining a motor driving apparatus according to a fourth embodiment of the present invention.

A motor driving apparatus 100d according to the fourth embodiment has an input connected to a single-phase AC power supply 1, and drives an induction motor 10 by a three-phase AC output at an arbitrary frequency.

Hereinafter, a single-phase rectifier circuit 3, an inverter circuit 4, and an inverter control circuit 5d that constitute the motor driving apparatus 100d will be described in detail.

The single-phase rectifier circuit 3 and the inverter circuit 4 are identical to those of the motor driving apparatus 100b according to the second embodiment.

The inverter control unit 5d supplies the inverter circuit 4 with a drive signal Sg so that the induction motor 10 is driven at a rpm desired by the user. The inverter control unit 5d comprises a power supply voltage estimation unit 6a, an inverter input voltage detection unit 8, and a drive signal generation unit 7d.

The power supply voltage estimation unit 6a and the inverter input voltage detection unit 8 are identical to those of the motor driving apparatus 100b according to the second embodiment.

The drive signal generation unit 7d calculates a PWM width of a pulse signal for turning on/off the respective switching elements 41 to 46 of the inverter circuit 4 on the basis of the rpm command ωo, and outputs the pulse signal having the calculated PWM width as a drive signal Sg. Further, the drive signal generation unit 7d compares the absolute value |v| of the power supply voltage v estimated by the power supply voltage estimation unit 6a with the inverter input voltage Vpn detected by the inverter input voltage detection unit 8, and determines the PWM width so that the waveform of the inverter input voltage Vpn becomes equal to the waveform of the absolute value |v| of the power supply voltage v.

To be specific, when the inverter input voltage Vpn takes a value which is larger than the absolute value |v| of the power supply voltage, the drive signal generation unit 7d changes the PWM width in the direction of reducing the angular velocity of the current supplied to the induction motor 10.

The reason is as follows. When the inverter input voltage Vpn takes a value which is larger than the absolute value |v| of the power supply voltage, the induced voltage of the induction motor 10 becomes higher than the voltage outputted from the inverter circuit 4, and a regenerative current flows, and conversely, a parasitic capacitance existing at the input side of the inverter circuit 4, and a capacitor existing in a snubber circuit or a capacitor connected for smoothing are charged, resulting in a possibility that the angular velocity of the motor driving current is increased.

On the other hand, when the inverter input voltage Vpn takes a value which is smaller than the absolute value |v| of the power supply voltage, the drive signal generation unit 7*d* changes the PWM width in the direction of increasing the angular velocity of the current supplied to the induction motor 10.

The reason is as follows. When the inverter input voltage Vpn takes a value which is smaller than the absolute value |v| of the power supply voltage, the induced voltage of the induction motor 10 becomes lower than the voltage outputted from the inverter circuit 4, resulting in a possibility that the angular velocity of the motor driving current is decreased.

Further, when the inverter input voltage Vpn takes a value which is equal to the absolute value |v| of the power supply voltage, the drive signal generation unit 7*d* maintains the PWM width that depends on the rpm command.

The amount of adjustment of the angular velocity of the current supplied to the inductor motor 10 can be easily determined from a difference between the inverter input voltage Vpn and the absolute value |v| of the power supply voltage, and the average current that actually flows in the induction motor 10. However, the amount of adjustment of the angular velocity of the current supplied to the inductor motor 10 may be determined by feeding the difference voltage between the inverter input voltage Vpn of the absolute value |v| of the power supply voltage back to the amount of adjustment of the angular velocity so that the waveform of the inverter input voltage Vpn becomes equal to the absolute value |v| of the power supply voltage.

Next, the operation of the motor driving apparatus 100*d* will be described.

In the motor driving apparatus 100*d* according to the fourth embodiment, the operations of the single-phase rectifier circuit 3 and the inverter circuit 4 are identical to those of the motor driving apparatus 100*a* according to the first embodiment, and the motor 2 is driven by the output of the inverter circuit 4.

At this time, in the inverter control unit 5*d*, the waveform of the power supply voltage v is estimated by the power supply voltage estimation unit 6*a*, and the inverter input voltage Vpn is detected by the inverter input voltage detection unit 8. Then, in the drive generation unit 7*d*, a pulse signal to be applied to the gates of the switching elements 41 to 46 is generated as the drive signal Sg on the basis of the rpm command ωo supplied from the outside, the power supply voltage v, and the inverter input voltage Vpn.

That is, the drive signal generation unit 7*d* changes the PWM width in the direction of decreasing the angular velocity of the current supplied to the induction motor 10 when the level of the inverter input voltage Vpn takes a value which is larger than the absolute value |v| of the power supply voltage. On the other hand, the drive signal generation unit 7*d* changes the PWM width in the direction of increasing the angular velocity of the current supplied to the induction motor 10 when the level of the inverter input voltage Vpn takes a value which is smaller than the absolute value |v| of the power supply voltage. Further, when the level of the inverter input voltage Vpn is equal to the absolute value |v| of the power supply voltage, the drive signal generation unit 7*d* maintains the PWM width that depends on the rpm command.

By controlling the current supplied to the motor as described above, the waveform of the current flowing from the single-phase AC power supply 1 into the motor driving apparatus 100*d* becomes a favorable one.

The mechanism of improving the power factor will be briefly described.

When a regenerative current flows from the induction motor 10 into the inverter circuit 4, the parasitic capacitance at the input side of the inverter circuit 4 is charged, whereby the input voltage of the inverter circuit 4 becomes higher than the voltage of the single-phase AC power supply 1 that is placed before the rectifier circuit 3. Therefore, it is considered that a regenerative current flows when the input voltage of the inverter circuit 4 is higher than the absolute value of the power supply voltage 1. Accordingly, during the period when a regenerative current is assumed to be generated, the drive signal generation unit 7*d* decreases the angular velocity of the current that drives the induction motor 10 to increase the current. Thereby, the induced voltage that occurs in the induction motor 10 decreases, and the regenerative current that brakes the induction motor 10 decreases, whereby the torque that occurs in the induction motor 10 increases, resulting in an increase in motor driving efficiency. Further, when the regenerative current is decreased, the waveform of the input voltage of the inverter circuit 4 becomes approximately equal to the waveform of the absolute value of the power supply voltage 1, whereby the energization period of the diode rectifier circuit that exists between the single-phase AC power supply 1 and the inverter circuit 4 is increased.

On the other hand, it is considered that a current which is larger than the current required for driving the motor flows in the rectifier circuit when the input voltage of the inverter circuit is lower than the absolute value of the power supply voltage 1. Accordingly, during the period when a current which is larger than the required current flows, the drive signal generation unit 7*d* increases the angular velocity of the current that drives the induction motor to reduce the current. Therefore, the level of the inverter input voltage Vpn is increased, thereby avoiding the situation where a current which is larger than the current required for driving the motor flows into the rectifier circuit.

As a result, the waveform of the current supplied from the power supply to the motor driving apparatus is favorably corrected, resulting in an improved input power factor of the motor driving apparatus.

As described above, the motor driving apparatus 100*d* according to the fourth embodiment is provided with the single-phase rectifier circuit 3 that is connected to the single-phase AC power supply 1, the inverter circuit 4 that is connected to the output of the single-phase rectifier circuit 3 and generates a driving current for the motor 2, and the inverter control unit 5*d* for controlling the inverter circuit 4. The inverter control unit 5*d* compares the absolute value |v| of the power supply voltage v estimated by the power supply voltage estimation unit 6*a* with the inverter input voltage Vpn detected by the inverter input voltage detection unit 8, and changes the PWM width in the direction of decreasing or increasing the angular velocity of the motor current so that the waveform of the inverter input voltage Vpn becomes equal to the waveform of the absolute value |v| of the power supply voltage. Therefore, the input power factor of the motor driving apparatus for driving the DC brushless motor is improved without modulating the waveform of the motor driving current according to the waveform of the power supply voltage or performing advance control for the motor driving voltage according to the motor induced voltage, resulting in a motor driving apparatus of a relatively simple circuit construction, that is able to efficiently drive the DC brushless motor, and clears the IEC harmonics standards.

While the inverter control unit 5d controls the angular velocity of the current supplied to the motor in this fourth embodiment, that is, the output current of the inverter circuit, the inverter control unit may control the angular velocity of the voltage supplied to the motor, that is, the output voltage of the inverter circuit. In this case, the same effects as described above can also be achieved.

Furthermore, in this fourth embodiment, the drive signal generation unit 7d performs the first control for changing the PWM width in the direction of decreasing the angular velocity of the current supplied to the motor 2 when the level of the inverter input voltage Vpn takes a value which is larger than the absolute value |v| of the power supply voltage, and performs the second control for changing the PWM width in the direction of increasing the angular velocity of the current supplied to the motor 2 when the level of the inverter input voltage Vpn takes a value which is smaller than the absolute value |v| of the power supply voltage. However, the drive signal generation unit 7d may perform either of the first control and the second control.

Fifth Embodiment

Figure 7:
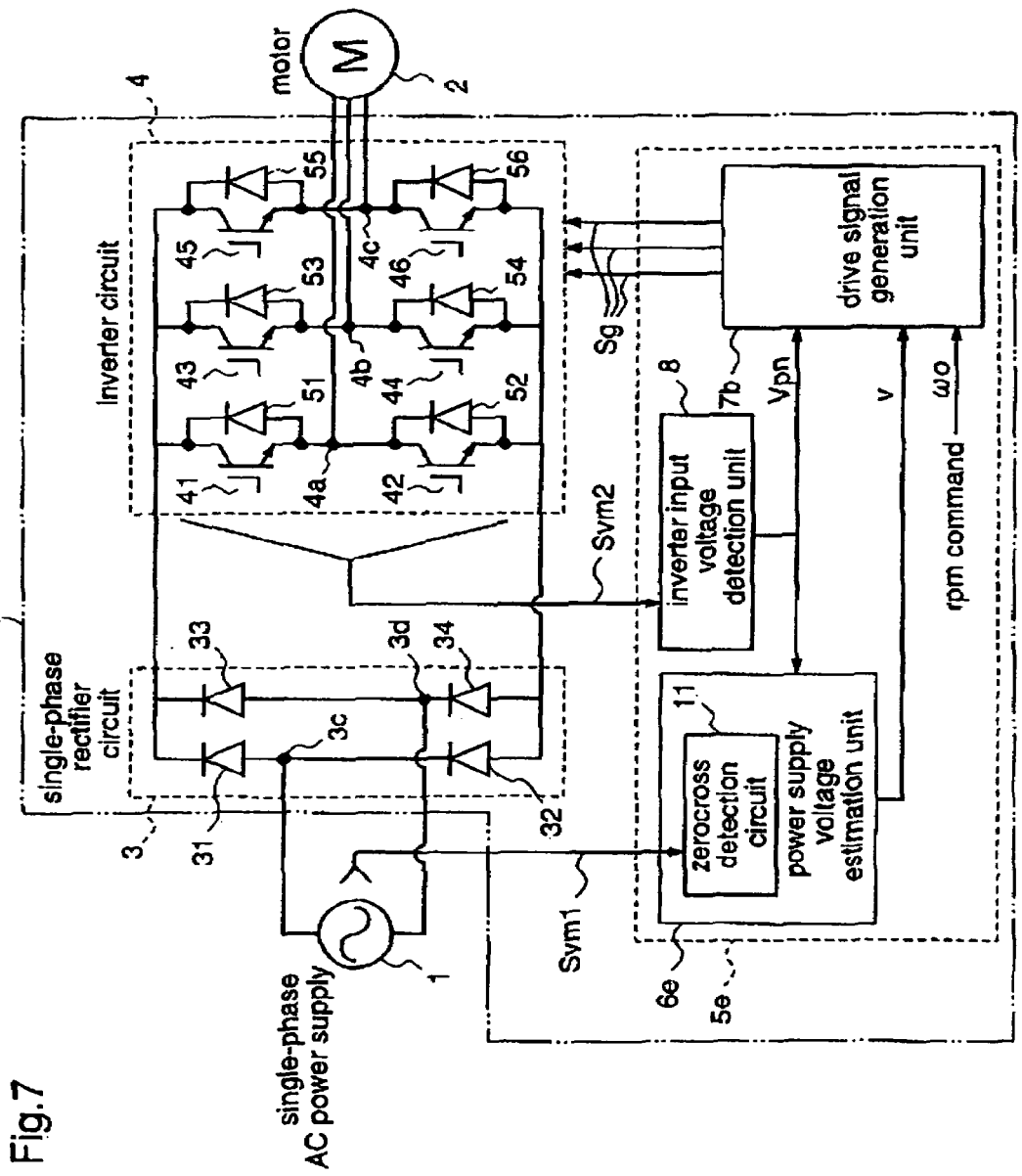
FIG. 7 is a block diagram for explaining a motor driving apparatus according to a fifth embodiment of the present invention.

FIG. 7 is a block diagram for explaining a motor driving apparatus according to a fifth embodiment of the present invention.

A motor driving apparatus 100e according to the fifth embodiment is provided with a single-phase rectifier circuit 3 connected to a single-phase AC power supply 1, an inverter circuit 4 that is connected to the single-phase rectifier circuit 3 and outputs a motor driving current and a motor driving voltage, and an inverter control unit 5e for controlling the inverter circuit 4.

The signal-phase rectifier circuit 3 and the inverter circuit 4 are identical to those of the motor driving apparatus 100b according to the second embodiment. The inverter control unit 5e is provided with a power supply voltage estimation unit 6e for estimating a power supply voltage v by using zerocross timings of the single-phase AC power supply 1, instead of the power supply voltage estimation unit 6a in the inverter control unit 5a according to the second embodiment. The inverter input voltage detection unit 8 and the drive signal generation unit 7b included in the inverter control unit 5e are identical to those of the second embodiment.

Hereinafter, the power supply voltage estimation unit 6e will be described.

A zerocross detection circuit 11, as a constituent of the power supply voltage estimation unit 6e, detects a timing of zerocross of the single-phase AC power supply 1. To be specific, the power supply voltage estimation unit 6e has a resistance circuit for driving the power supply voltage by using resistors and a photocoupler connected to the output of the resistance circuit, obtains a rectangle wave by full-wave-rectifying the power supply voltage on the basis of the output of the photocoupler, and detects a rising edge and a falling edge of the rectangle wave as zerocross timings.

However, when using a photocoupler as mentioned above, the power supply voltage estimation unit 6e might detect, not the actual zerocross timing of the power supply voltage, but the timing of the minimum level of the power supply voltage at which a current flows into the photocoupler. In this case, the cycle of the voltage of the single-phase power supply 1 is obtained from one rising timing of the output of the photocoupler and the next rising timing, and the timing at which the voltage of the single-phase power supply 1 reaches the peak level is obtained from the rising timing and the falling timing, whereby a correct zerocross timing can be obtained from the cycle of the power supply voltage and the rising timing or the falling timing.

The power supply voltage estimation unit 6e estimates the sinusoidal wave voltage v outputted from the power supply 1, from the zerocross timing detected by the zerocross detection circuit 11, and the peak value of the inverter input voltage Vpn detected by the inverter input voltage detection unit 8. In this case, even when the amplitude value of the power supply voltage changes for any reason, the power supply voltage can be accurately estimated, resulting in highly-precise control Next, the operation of the motor driving apparatus 100e will be described.

In the motor driving apparatus 100e constructed as described above, the single-phase rectifier circuit 3 and the inverter circuit 4 operate in a manner similar to those of the second embodiment.

In the power supply voltage estimation unit 6e, the zerocross timing of the power supply voltage is detected by the zerocross detection circuit 11, and the waveform of the power supply voltage is estimated from the peak value of the inverter input voltage Vpn detected by the inverter input voltage detection unit 8, and the detected zerocross timing of the power supply voltage.

Then, in the drive signal generation unit 7b, the PWM width of the pulse signal applied to the switching elements 41 to 46 of the inverter circuit is determined on the basis of the rpm command ωo supplied from the outside, the waveform of the power supply voltage v and the inverter input voltage Vpn, and the pulse signal having the determined PWM width is output as the drive signal Sg.

As described above, in the motor driving apparatus 100e according to the fifth embodiment, the power supply voltage estimation unit 6e is provided with the zerocross detection circuit 11 for detecting the zerocross timing of the single-phase AC power supply 1, and estimates the voltage of the single-phase AC power supply from the zerocross timing detected by the zerocross detection circuit 11. Therefore, in addition to the effects of the second embodiment, the voltage waveform of the single-phase AC power supply can be easily estimated without using expensive components such as an AD converter for converting the monitor signal of the power supply voltage.

In this fifth embodiment, the motor driving apparatus 100e is provided with the power supply voltage estimation unit 6e for estimating the power supply voltage v by using the zerocross timing of the single-phase AC power supply 1, instead of the power supply voltage estimation unit 6a of the motor driving apparatus 100b according to the second embodiment. However, the motor driving apparatus according to the third or fourth embodiment may be provided with the power supply voltage estimation unit 6e.

Further, in this fifth embodiment, the power supply voltage estimation unit 6e estimates the waveform of the power supply voltage from the zerocross timing and the peak value of the inverter input voltage Vpn. However, the power supply voltage estimation unit 6e may estimate the waveform of the power supply voltage from the zerocross timing and the already-known voltage peak value of the single-phase AC power supply 1. Further, the motor driving apparatus according to the third or fourth embodiment may be provided with the power supply voltage estimation unit 6e.

Sixth Embodiment

Figure 8:
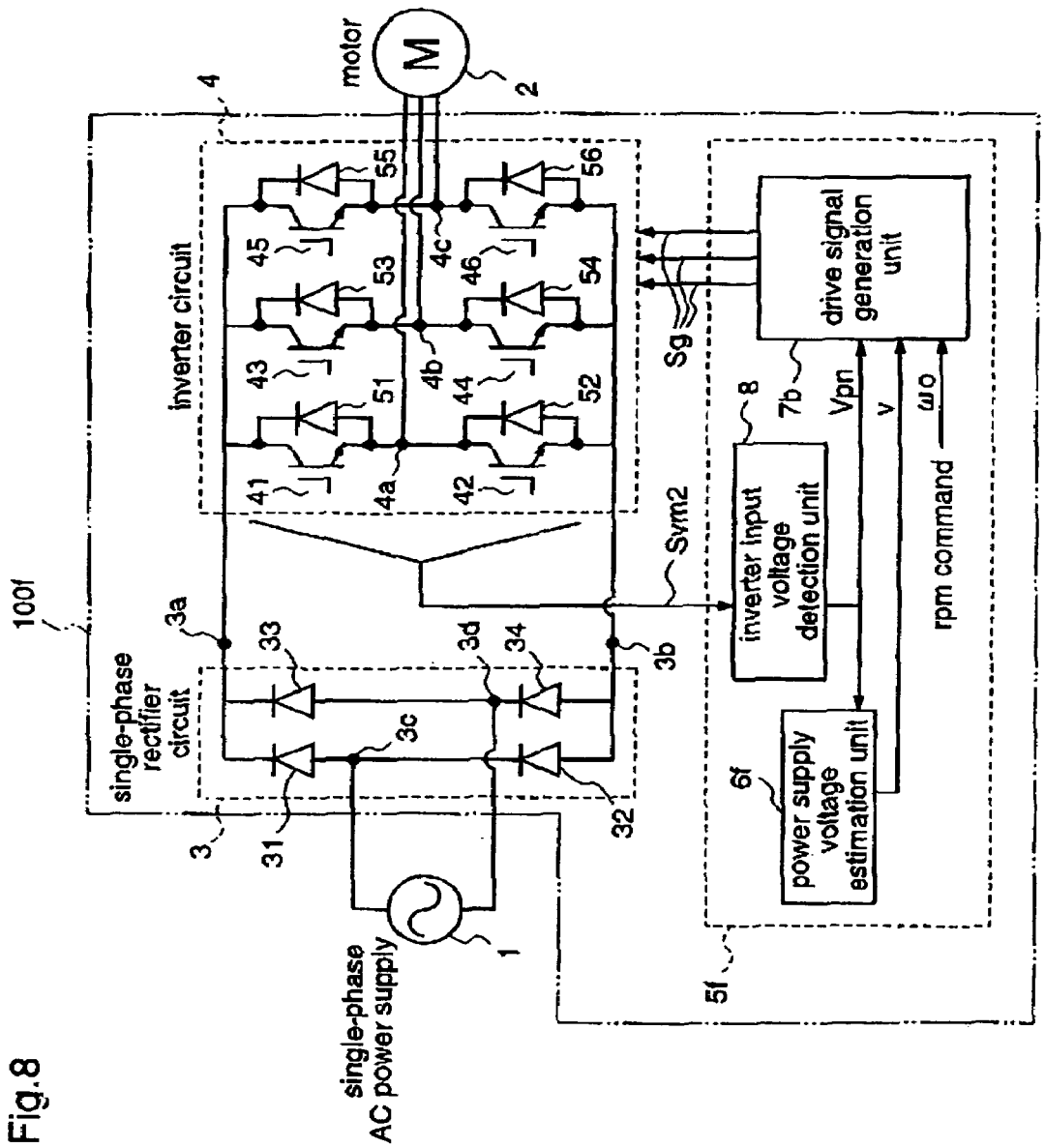
FIG. 8 is a block diagram for explaining a motor driving apparatus according to a sixth embodiment of the present invention.

FIG. 8 is a block diagram for explaining a motor driving apparatus according to a sixth embodiment of the present invention.

A motor driving apparatus 100f according to the sixth embodiment is provided with a single-phase rectifier circuit 3 connected to a single-phase AC power supply 1, an inverter circuit 4 that is connected to the single-phase rectifier circuit 3 and outputs a motor driving current and a motor driving voltage, and an inverter control unit 5f for controlling the inverter circuit 4.

The signal-phase rectifier circuit 3 and the inverter circuit 4 are identical to those of the motor driving apparatus 100b according to the second embodiment. The inverter control unit 5f is provided with a power supply voltage estimation unit 6f for estimating the waveform of the power supply voltage v by using the input voltage Vpn of the inverter circuit 4. Further, an inverter input voltage detection unit 8 and a drive signal generation unit 7b included in the inverter control unit 5f are identical to those of the second embodiment.

Hereinafter, the power supply voltage estimation unit 6f will be described.

The power supply voltage detection unit 6f estimates a timing at which the power supply voltage takes a peak value from a timing at which the inverter input voltage Vpn detected by the inverter input voltage detection unit 8 takes a peak value, and then estimates a sinusoidal voltage as a waveform of the power supply voltage on the basis of the estimated timing and the peak level of the inverter input voltage.

Next, the operation of the motor driving apparatus 100f will be described.

In the motor driving apparatus 100f according to the sixth embodiment, the single-phase rectifier circuit 3 and the inverter circuit 4 operate in a manner similar to those of the second embodiment.

In the power supply voltage estimation unit 6f, the timing at which the inverter input voltage Vpn takes a peak value is detected on the basis of the inverter input voltage Vpn detected by the inverter input voltage detection unit 8 and the timing at which the power supply voltage takes a peak level is estimated from the detected timing, and the waveform of the sinusoidal voltage as the waveform of the power supply voltage is estimated from the estimated timing at which the power supply voltage attains the peak level and the peak level of the inverter input voltage.

Then, in the drive signal generation unit 7b, the PWM width of the pulse signal applied to the switching elements 41 to 46 of the inverter circuit is determined on the basis of the rpm command ωo supplied from the outside, the waveform of the estimated power supply voltage v and the inverter input voltage Vpn, and the pulse signal having the determined PWM width is output as a drive signal Sg of the inverter circuit 4.

As described above, according to the sixth embodiment of the invention, the power supply voltage estimation unit 6f detects the timing at which the inverter input voltage takes the maximum value, on the basis of the inverter input voltage detected by the inverter, and the voltage of the single-phase AC power supply is estimated from the detected timing and the value of the inverter input voltage at this time. Therefore, in addition to the effects of the second embodiment, a circuit for monitoring the power supply voltage can be dispensed with, whereby the voltage waveform of the single-phase AC power supply can be easily estimated by a circuit construction with a smaller number of components.

In this sixth embodiment, the power supply voltage detection unit 6f estimates the waveform of the power supply voltage from the timing of taking the peak level of the inverter input voltage Vpn and the peak level of the inverter input voltage. However, the power supply voltage detection unit 6f may estimate the waveform of the power supply voltage from the timing of taking the peak level of the inverter input voltage Vpn, and the already-known voltage peak level of the single-phase AC power supply 1.

Furthermore, in this sixth embodiment, the motor driving apparatus 100f is provided with the power supply voltage estimation unit 6f for estimating the waveform of the power supply voltage by using the input voltage Vpn of the inverter circuit 4, instead of the power supply voltage estimation unit 6a of the motor driving apparatus 100b according to the second embodiment. However, the motor driving apparatus according to the third or fourth embodiment may be provided with the power supply voltage estimation unit 6f.

Seventh Embodiment

Figure 9:
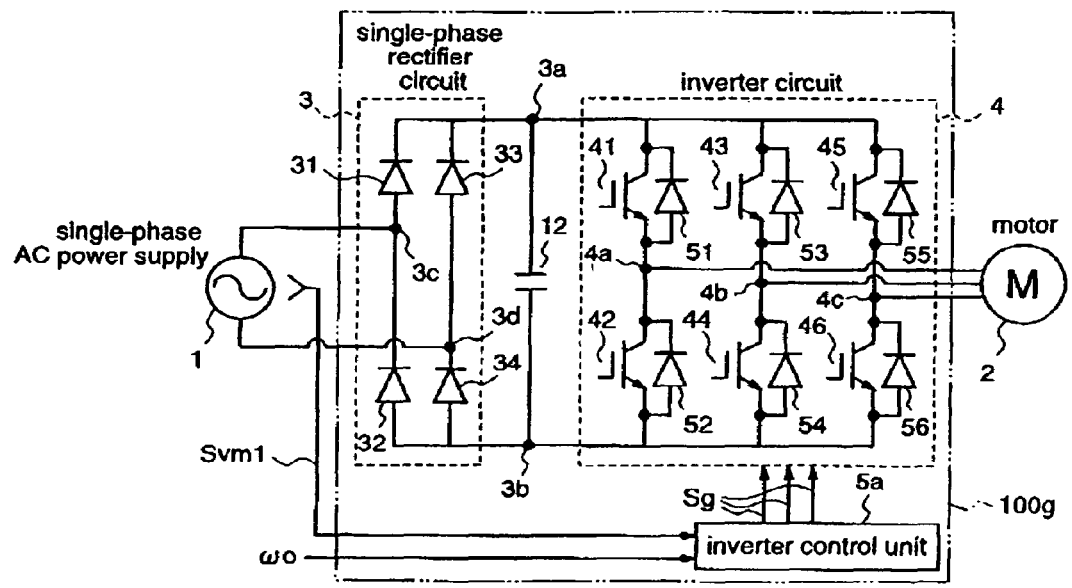
FIG. 9 is a block diagram for explaining a motor driving apparatus according to a seventh embodiment of the present invention.

FIG. 9 is a block diagram for explaining a motor driving apparatus according to a seventh embodiment of the present invention.

In a motor driving apparatus 100g according to the seventh embodiment, a small-capacitance capacitor 12 for charging a regenerative current from the motor 2 is added at the output end of the single-phase rectifier circuit 3 of the motor driving apparatus 100a according to the first embodiment. The capacitor 12 is connected between one output terminal 3a and the other output terminal 3b of the single-phase rectifier circuit 3.

The other constituents of the motor driving apparatus 100g according to the seventh embodiment are identical to those of the motor driving apparatus 10a according to the first embodiment.

Figure 11:
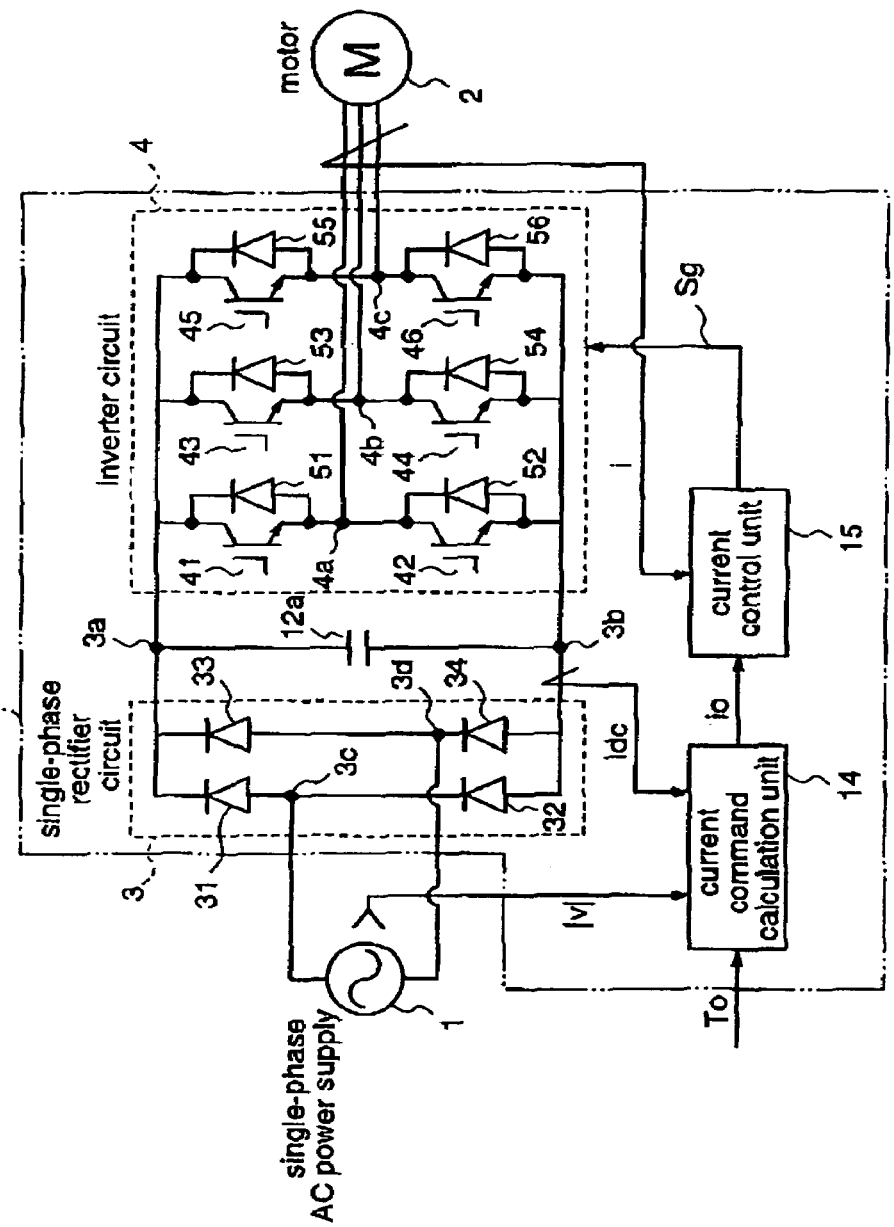
FIG. 11 is a block diagram for explaining the conventional motor driving apparatus.

The capacitance of the capacitor 12 may be set to an extent such that damages on the apparatus due to the motor regenerative current are prevented. For example, when the motor control apparatus controls a motor of a compressor used in a home-use air conditioner, the capacitance of the capacitor 12 is about 0.1 F~50 μF. This value is the minimum threshold value that is obtained from the capacitance of the inductance of the motor, the maximum allowable amount of variation in the inverter input voltage, and the maximum value of the current flowed to the motor. The capacitance of the capacitor 12 is about 1/1000 smaller than the capacitance of the smoothing capacitor 12a in the conventional motor driving apparatus 100 shown in FIG. 11.

That is, the energy held by the motor when the maximum current flows into the motor is obtained from the capacitance of the inductance in the motor. The capacitance of the capacitor is determined on the basis of the extent to which an increase in the terminal voltage of the capacitor is allowed, which occurs when the energy is given to the capacitor as a motor regenerative current.

To be specific, assuming that the maximum current flowing into the motor is Im, the inductance in the motor is Lm, and the allowable increase value in the capacitor terminal voltage is Vm, the capacitance Cm of the capacitor is determined by Cm>Lm·Im·Im/Vm/Vm.

Next, the operation of the motor driving apparatus 100g will be described.

In the motor driving apparatus 100g according to the seventh embodiment, the single-phase rectifier circuit 3, the inverter circuit 4, and the inverter control unit 5a operate in a manner similar to those of the first embodiment, and therefore, repeated description is not necessary.

When the motor 2 is stopped or the switching operation of the inverter circuit 4 is stopped, the current that flows in the motor 2 is regenerated at the input side of the inverter circuit 4. When the regenerative current is large, the voltage at the input side of the inverter circuit 4 becomes excessively large, resulting in damages in the motor driving apparatus.

In the motor driving apparatus 100g according to the seventh embodiment, since the capacitor 12 is added at the output end of the single-phase rectifier circuit 3, i.e., at the input end of the inverter circuit 4 as shown in FIG. 9, the regenerative current from the motor 2 is charged by the capacitor 12 when the motor 2 is stopped, thereby suppressing an increase in the voltage at the input end of the inverter circuit 4 due to the regenerative current.

Thereby, the motor driving apparatus is prevented from being damaged by the motor regenerative current that occurs when the motor is stopped, resulting in a motor control apparatus with a higher level of safety.

As described above, according to the seventh embodiment, the capacitor for charging the regenerative current from the motor is added at the output side of the rectifier circuit 3a of the motor driving apparatus 100a of the first embodiment. Therefore, in addition to the effects of the first embodiment, it is possible to suppress an increase in the inverter input voltage that occurs when the motor is stopped or the switching operation of the inverter circuit is stopped, thereby avoiding destruction of components or the like.

In this seventh embodiment, the capacitor for charging the regenerative current from the motor is added at the output end of the rectifier circuit 3 of the motor driving apparatus 100a of the first embodiment. However, the motor driving apparatus according to any of the second to sixth embodiments may be provided with this capacitor.

Eighth Embodiment

Figure 10:
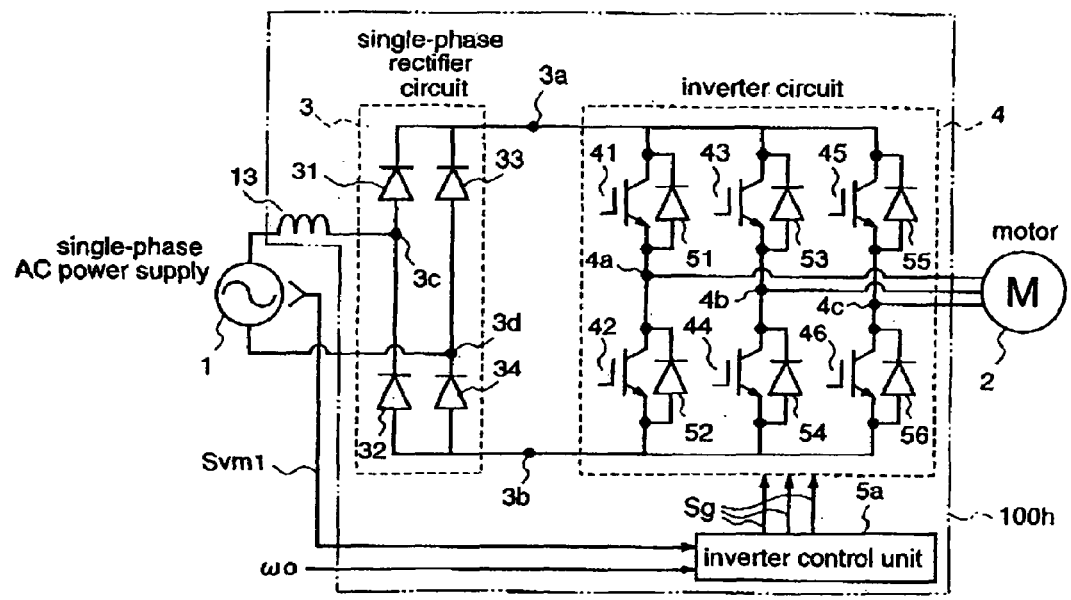
FIG. 10 is a block diagram for explaining a motor driving apparatus according to an eighth embodiment of the present invention.

FIG. 10 is a block diagram for explaining a motor driving apparatus according to an eighth embodiment of the present invention.

A motor driving apparatus 100h according to the eighth embodiment is obtained by inserting an inductor 13 between the single-phase rectifier circuit 3 and the single-phase AC power supply 1 of the motor driving apparatus 100a according to the first embodiment, and the inductor 13 is connected in series between the single-phase AC power supply 1 and the single-phase rectifier circuit 3.

Other constituents of the motor driving apparatus 100h are identical to those of the motor driving apparatus 100a according to the first embodiment.

The capacitance of the inductor 13 may be set to an extent that eliminates switching current noise caused by the switching operation of the inverter circuit, and does not distort the waveform of the power supply current. For example, when the motor driving apparatus drives a motor of a compressor used in a home-use air conditioner, the value of the inductor 13 is about 0.01 mH to 4.0 mH. This value is in proportion to the inverse of the carrier frequency in the inverter circuit 4, and the value of the inductor 13 is determined so as to suppress the harmonics of the carrier components. The value of the inductor 13 is as small as about 1/1000 of the value of the inductor used as a reactor for improving the power factor of the conventional motor driving apparatus.

To be specific, assuming that the amount to be attenuated is $-X[dB]$, the circular constant is $\pi$, and the carrier frequency is $f[Hz]$, the value Lr of the inductor is determined to be at a value that satisfies $10 \times \log(2 \times \pi \times f \times L) > X$.

Next, the operation of the motor driving apparatus 100h will be described.

In the motor driving apparatus 100h according to the eighth embodiment, the single-phase rectifier circuit 3, the inverter circuit 4, and the inverter control unit 5a operate in a manner similar to those of the first embodiment, and therefore, repeated description is not necessary.

The output current of the single-phase AC power supply 1 is affected by the switching operation of the inverter circuit 4, and the switching current is superposed as noise.

In the motor driving apparatus 100h according to the eighth embodiment, as shown in FIG. 10, the noise that occurs in the inverter circuit 4 is cut by the inductor 13 inserted between the single-phase AC power supply 1 and the single-phase rectifier circuit 3, whereby the power supply switching noise superposed on the output current of the power supply is reduced. Thereby, the waveform of the output current of the single-phase AC power supply 1 is prevented from being distorted, resulting in an improved power factor of the input current.

As described above, according to the eighth embodiment of the present invention, the inductor 13 for cutting the noise that occurs in the inverter circuit 4 is inserted between the input of the rectifier circuit 3 and the single-phase AC power supply 1 of the motor driving apparatus 100a of the first embodiment. Therefore, in addition to the effects of the first embodiment, the switching noise superposed on the output of the single-phase AC power supply 1 is reduced, whereby the power factor of the input current is increased, resulting in improved current waveform.

While the inductor 13 for cutting the noise that occurs in the inverter circuit 4 is inserted in this eighth embodiment between the rectifier circuit 3 and the single-phase AC current supply 1 of the motor driving apparatus 100a, the motor driving apparatus according to any of the second to sixth embodiments may be provided with such an inductor.

Further, the motor driving apparatus according to the seventh embodiment is provided with the capacitor at the output end of the single-phase rectifier circuit, and the motor driving apparatus according to the eighth embodiment is provided with the capacitor between the single-phase rectifier circuit and the power supply. However, the motor driving apparatus may be provided with both of the capacitor and the inductor.

In this case, since a circuit comprising the inductor and the capacitor connected in series is created, a resonance phenomenon might occur. This resonance frequency is $1/2\pi \sqrt{(LC)}$ as generally known, and it depends on the capacitances of the inductor and capacitor. Accordingly, a motor control apparatus of less noise can be provided by determining the capacitances of the inductor and capacitor so that the resonance frequency becomes higher than the frequency to be a target of harmonics regulation to the power supply.

Furthermore, the motor driving apparatus according to the present invention (first to eighth embodiments) is not restricted to one for controlling a motor of a compressor used in an air conditioner, The motor driving apparatus of the present invention may control a motor of any equipment so long as it controls the motor using an inverter circuit.

For example, equipment to which the motor driving apparatus according to the present invention is applicable includes a refrigerator, an electric washing machine, an electric dryer, an electric vacuum cleaner, an air blower and the like, in which a motor and an inverter circuit for generating a motor driving current are mounted. In any equipment, a reduction in cost and a high degree of freedom in design can be realized by reducing the size and weight of the inverter circuit.

Ninth Embodiment

Figure 12:
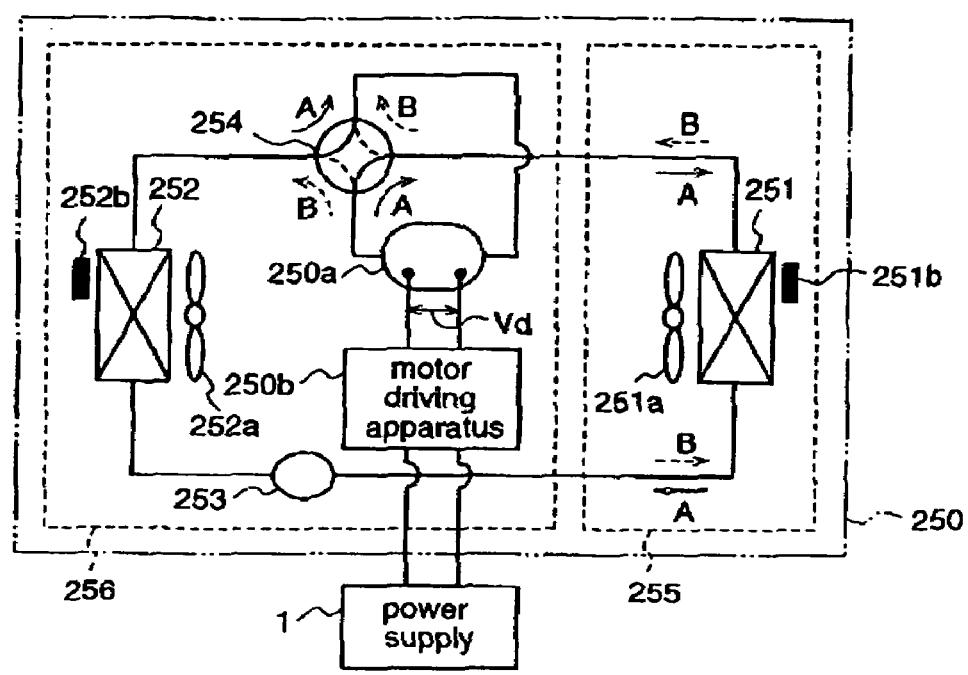
FIG. 12 is a schematic diagram for explaining an air conditioner according to a ninth embodiment of the present invention.

FIG. 12 is a block diagram for explaining an air conditioner according to a ninth embodiment of the present invention.

An air conditioner 250 according to the ninth embodiment has an indoor unit 255 and an outdoor unit 256, and performs cooling and heating.

The air conditioner 250 is provided with a compressor 250a for circulating a refrigerant between the indoor unit 255 and the outdoor unit 256, and a motor driving unit (apparatus) 250b for driving a motor of the compressor 250a. In FIG. 12, a power supply 1, the motor of the compressor 250a, and a motor driving apparatus 250b are identical to the single-phase AC power supply 1, the motor 2, and the motor driving apparatus 100a according to the first embodiment, respectively.

Further, the air conditioner 250 has a four-way valve 254, a throttle 253, an indoor heat exchanger 251, and an outdoor heat exchanger 252. The indoor heat exchanger 251 is a component of the indoor unit 255, while the throttle 253, the outdoor heat exchanger 252, the compressor 250a, the four-way valve 254, and the motor driving apparatus 250b are components of the outdoor unit 256.

The indoor heat exchanger 251 has an air blower 251a for increasing the efficiency of heat exchange, and a temperature sensor 251b for measuring the temperature of the heat exchanger 251 or the ambient temperature thereof. The outdoor heat exchanger 252 has an air blower 252a for increasing the efficiency of heat exchange, and a temperature sensor 252b for measuring the temperature of the heat exchanger 252 or the ambient temperature thereof.

In this ninth embodiment, the compressor 250a and the four-way valve 254 are placed in the refrigerant path between the indoor heat exchanger 251 and the outdoor heat exchanger 252. That is, in this air conditioner 250, the four-way valve 254 selects either of two states as follows: the state where the refrigerant flows in the direction of arrow A, the refrigerant that has passed through the outdoor heat exchanger 252 is sucked into the linear compressor 250a, and the refrigerant discharged from the linear compressor 250a is supplied to the indoor heat exchanger 251; and the state where the refrigerant flows in the direction of arrow B, the refrigerant that has passed through the indoor heat exchanger 251 is sucked into the linear compressor 250a, and the refrigerant discharged from the linear compressor 250a is supplied to the outdoor heat exchanger 252.

Further, the throttle 253 has both the function of reducing the flow rate of the circulating refrigerant and the function as a valve for automatically controlling the flow rate of the refrigerant. That is, under the state where the refrigerant is circulating in the refrigerant circulation path, the throttle 253 reduces the flow rate of the fluid refrigerant outputted from the condenser to the evaporator to expand the fluid refrigerant, and supplies a proper amount of refrigerant that is required for the evaporator.

The indoor heat exchanger 251 operates as the condenser during heating and as the evaporator during cooling. The outdoor heat exchanger 252 operates as the evaporator during heating and as the condenser during cooling. In the condenser, the high-temperature and high-pressure refrigerant gradually liquefies while losing heat to the air that is blown into the condenser, resulting in a high-pressure fluid refrigerant in the vicinity of the outlet of the condenser. This is equivalent to the refrigerant liquefying while radiating heat into the air. Further, the fluid refrigerant whose temperature and pressure are reduced by the throttle 253 flows into the evaporator. When the indoor air is blown into the evaporator under this state, the fluid refrigerant takes a great amount of heat from the air and evaporates, resulting in a low-temperature and low-pressure gas refrigerant. The air which has lost a great amount of heat in the evaporator is discharged as cool air from the blowoff port of the air conditioner.

Then, in the air conditioner 250, a command rpm of the motor is set on the basis of the operation state of the air conditioner, i.e., the target temperature set on the air conditioner and the actual indoor and outdoor temperatures, and the motor driving apparatus 250b controls the rpm of the motor of the compressor 250a on the basis of the set command rpm as in the first embodiment.

Next, the operation of the air conditioner 250 will be described.

When a driving voltage is supplied from the motor drive control unit 250b to the compressor 250a, the refrigerant circulates in the refrigerant circulation path, and heat exchange is carried out in the heat exchanger 251 of the indoor unit 255 and the heat exchanger 252 of the outdoor unit 256. That is, in the air conditioner 250, a well-known heat pump cycle is formed in the refrigerant circulation path by circulating the refrigerant sealed in the circulation path, by using the compressor 250a. Thereby heating or cooling for a room is carried out.

For example, when the air conditioner 250 performs heating, the four-way valve 254 is set by a user operation so that the refrigerant flows in the direction of arrow A. In this case, the indoor heat exchanger 251 operates as a condenser, and discharges heat by circulation of the refrigerant in the refrigerant circulation path. Thereby, the room is heated.

Conversely, when the air conditioner 250 performs cooling, the four-way valve 254 is set by a user operation so that the refrigerant flows in the direction of arrow B. In this case, the indoor heat exchanger 251 operates as an evaporator, and absorbs heat from the ambient air by circulation of the refrigerant in the refrigerant circulation path. Thereby, the room is cooled.

In the air conditioner 250, the command rpm is determined on the basis of the target temperature set on the air conditioner as well as the actual room temperature and outdoor temperature, and the motor driving apparatus 250b controls the rpm of the motor of the compressor 250a on the basis of the command rpm as in the first embodiment. Thereby, comfortable cooling or heating is carried out by the air conditioner 250.

As described above, in the air conditioner 250 according to the ninth embodiment, the motor driving apparatus for driving the motor as a power source of the compressor 250a decreases the current applied to the motor in the operation section where the power supply voltage v changes from zero to peak, and increases the current in the operation section where the power supply voltage v changes from peak to zero. Therefore, the current outputted from the single-phase AC power supply 1 is leveled, and the values of the capacitor and inductor in the motor driving apparatus are reduced while minimizing reduction in the power factor due to waveform distortion in the current supplied from the power supply. Thereby, the motor driving apparatus in the air conditioner is reduced in size and weight while satisfying the restrictions on the input power factor and the IEC harmonics standards, resulting in an inexpensive air conditioner having a high degree of freedom.

Tenth Embodiment

Figure 13:
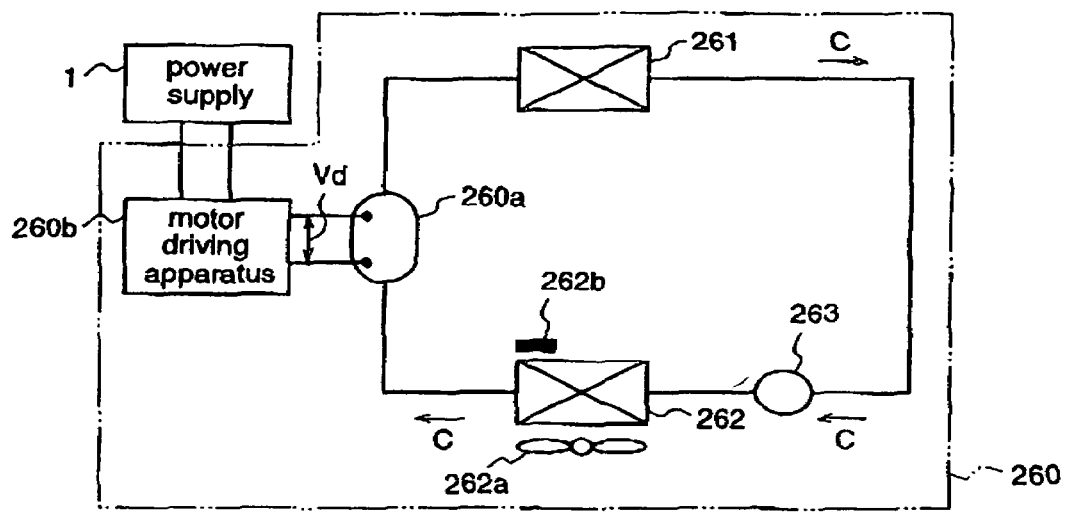
FIG. 13 is a schematic diagram for explaining a refrigerator according to a tenth embodiment of the present invention.

FIG. 13 is a block diagram for explaining a refrigerator according to a tenth embodiment of the present invention.

A refrigerator 260 according to this tenth embodiment comprises a compressor 260a, a motor driving apparatus 260b, a condenser 261, an evaporator 262, and a throttle 263.

The compressor 260a, the condenser 261, the throttle 263, and the evaporator 262 make a refrigerant circulation path. The motor driving apparatus 260b has an input connected to the power supply 1, and drives a motor as a drive source of the compressor 260a. The power supply 1, the motor of the compressor 160a, and the motor driving apparatus 260b are identical to the single-phase AC power supply 1, the motor 2, and the motor driving apparatus 100a according to the first embodiment, respectively.

The throttle 263 reduces the flow rate of the fluid refrigerant outputted from the condenser 261 to expand the fluid refrigerant under the state where the refrigerant is circulating in the refrigerant circulation path, and supplies a proper amount of refrigerant that is required for the evaporator 262.

The condenser 261 condenses the high-temperature and high-pressure refrigerant gas flowing therein, and discharges the heat of the refrigerant to the outside air. The refrigerant gas sent into the condenser 261 gradually liquefies while losing heat to the outside air, resulting in a high-pressure fluid refrigerant in the vicinity of the outlet of the condenser 261.

The evaporator 262 evaporates the low-temperature fluid refrigerant to cool the inside of the refrigerator 260. The evaporator 262 has an air blower 262a for increasing efficiency of heat exchange, and a temperature sensor 262b for detecting the temperature inside the refrigerator 260.

Then, in the refrigerator 260, a command rpm is set on the basis of the operation state of the refrigerator, i.e., the target temperature set on the refrigerator and the temperature inside the refrigerator, and the motor driving apparatus 260b controls the rpm of the motor of the compressor 260a on the basis of the set command rpm, as in the first embodiment.

Next, the operation of the refrigerator 260 will be described.

In the refrigerator 260, when a driving voltage Vd is supplied from the motor driving apparatus 260b to the motor of the compressor 260a, the compressor 260a is driven and the refrigerant circulates in the direction of arrow C in the refrigerant circulation path, whereby heat exchange is carried out between the condenser 261 and the evaporator 262. Thereby, the inside of the refrigerator 260 is cooled.

That is, the flow rate of the refrigerant, which is liquefied in the condenser 261, is reduced by the throttle 263, and thereby the refrigerant expands, resulting in a low-temperature fluid refrigerant. When the low-temperature fluid refrigerant is sent into the evaporator 262, the low-temperature fluid refrigerant is evaporated in the evaporator 262, whereby the inside of the refrigerator 260 is cooled. At this time, the air in the refrigerator 260 is compulsory sent into the evaporator 262 by the air blower 262a, and thereby heat exchange is efficiently carried out in the evaporator 262.

Further, in the refrigerator 260, the command rpm is set according to the target temperature set on the refrigerator 260 and the temperature in the refrigerator 260, and the motor driving apparatus 260b controls the rpm of the motor of the compressor 260a on the basis of the set command rpm, as in the first embodiment. Thereby, in the refrigerator 260, the temperature in the refrigerator 260 is maintained at the target temperature.

As described above, in the refrigerator 260 according to the tenth embodiment, the motor driving apparatus for driving the motor as a power source of the compressor 260a decreases the current applied to the motor in the operation section where the power supply voltage v changes from zero to peak, and increases the current in the operation section where the power supply voltage v changes from peak to zero. Therefore, the current outputted from the single-phase AC power supply 1 is leveled, and the values of the capacitor and inductor in the motor driving apparatus are reduced while minimizing reduction in the power factor due to waveform distortion in the current supplied from the power supply. Thereby, the motor driving apparatus in the refrigerator can be reduced in size and weight while satisfying the restrictions on the input power factor and the IEC harmonics standards, resulting in an inexpensive refrigerator having a high degree of freedom.

Eleventh Embodiment

Figure 14:
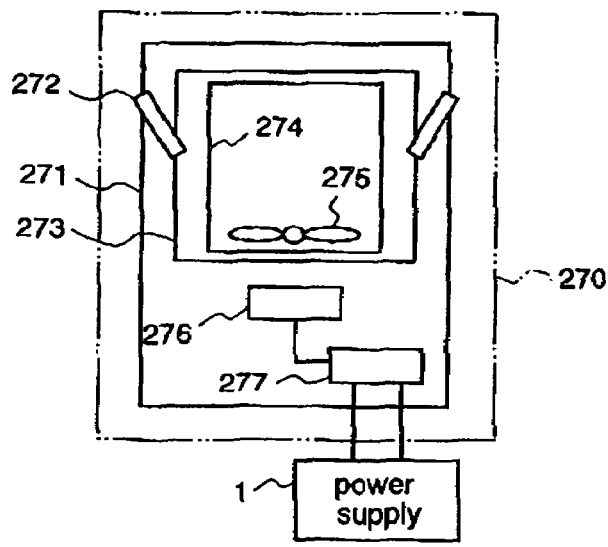
FIG. 14 is a schematic diagram for explaining an electric washing machine according to an eleventh embodiment of the present invention.

FIG. 14 is a block diagram for explaining an electric washing machine according to an eleventh embodiment of the present invention.

A washing machine 270 according to the eleventh embodiment has a washing machine outer frame 271, and an outer bath 273 is hung by a bar 272 in the outer frame 271. A washing/dewatering bath 274 is rotatably placed in the outer frame 273, and an agitation blade 275 is rotatably attached to the bottom of the washing/dewatering bath 274.

A motor 276 for rotating the washing/dewatering bath 274 and the agitation blade 275 are placed in a space beneath the outer bath 273 in the outer frame 271, and a motor driving apparatus 277 that is connected to an external power supply 1 and drives the motor 276 is attached to the outer frame 271.

The power supply 1, the motor 276, and the motor driving apparatus 277 are identical to the single-phase AC power supply 1, the motor 2, and the motor driving apparatus 100a according to the first embodiment, respectively. A rpm command indicating a rpm according to a user operation is input to the motor driving apparatus 277 from a microcomputer (not shown) that controls the operation of the washing machine 270.

Next, the operation of the washing machine 270 will be described.

In the washing machine 270, when a user performs a predetermined operation, a rpm command is output from the microcomputer to the motor driving apparatus 277, and a driving voltage is supplied from the motor driving apparatus 277 to the motor 276. Then, the agitation blade 275 or the washing/dewatering bath 274 is rotated by the motor 276, and washing or dewatering of laundry such as clothes in the bath 274 is carried out.

At this time, the rpm of the motor is controlled by the motor driving apparatus 277 on the basis of the rpm indicated by the rpm command from the microcomputer, as in the first embodiment. Thereby, the washing machine 270 operates according to the amount or stains of laundry.

As described above, in the washing machine 270 according to the eleventh embodiment, the motor driving apparatus for driving the motor 276 as a power source decreases the current supplied to the motor in the operation section where the power supply voltage v changes from zero to peak, and increases the current in the operation section where the power supply voltage v changes from peak to zero, as in the first embodiment. Therefore, the current outputted from the single-phase AC power supply 1 is leveled, and the values of the capacitor and the inductor in the motor driving apparatus are reduced. Thereby, the motor driving apparatus in the washing machine is reduced in size and weight while satisfying the restrictions on the input power factor and the IEC harmonics standards, resulting in an inexpensive washing machine having a high degree of freedom in design.

Twelfth Embodiment

Figure 15:
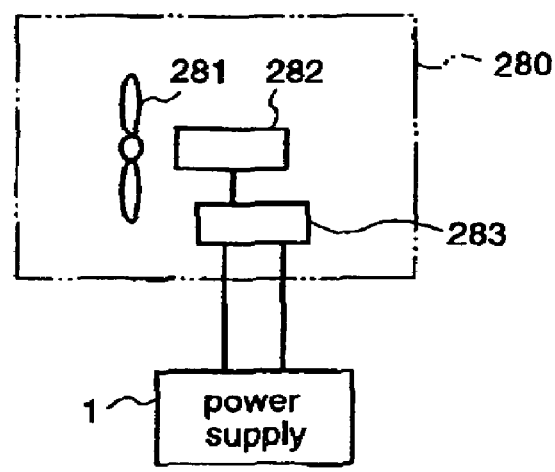
FIG. 15 is a schematic diagram for explaining an air blower according to a twelfth embodiment of the present invention.

FIG. 15 is a block diagram for explaining an air blower according to a twelfth embodiment of the present invention.

An air blower 280 according to the twelfth embodiment is provided with a fan 281, a motor 282 for rotating the fan 281, and a motor driving apparatus 283 that is connected to a power supply 1 and drives the motor 282.

The power supply 1, the motor 282, and the motor driving apparatus 283 are identical to the single-phase AC power supply 1, the motor 2, and the motor driving apparatus 100a according to the first embodiment, respectively, and a rpm command indicating a rpm according to a user operation is input to the motor driving apparatus 283 from a microcomputer (not shown) that controls the operation of the air blower 280.

Next, the operation of the air blower 280 will be described.

In the air blower 280, when the user performs a predetermined operation, a rpm command is output from the microcomputer to the motor driving apparatus 283, and a driving voltage is supplied from the motor driving apparatus 283 to the motor 282. Then, the fan 281 is rotated by the motor 282, and air blowing is carried out.

At this time, the output of the motor 282 is controlled by the motor driving apparatus 283 on the basis of the rpm command from the microcomputer, as in the first embodiment. Thereby, the amount or strength of wind is controlled.

As described above, in the air blower 280 according to the twelfth embodiment, the motor driving apparatus for driving the motor 282 as a power source decreases the current supplied to the motor in the operation section where the power supply voltage v changes from zero to peak, and increases the current in the operation section where the power supply voltage v changes from peak to zero, as in the first embodiment. Therefore, the current outputted from the single-phase AC power supply 1 is leveled, and the values of the capacitor and the inductor in the motor driving apparatus are reduced. Thereby, the motor driving apparatus in the air blower is reduced in size and weight while satisfying the restrictions on the input power factor and the IEC harmonics standards, leading to an inexpensive air blower having a high degree of freedom in design.

Thirteenth Embodiment

Figure 16:
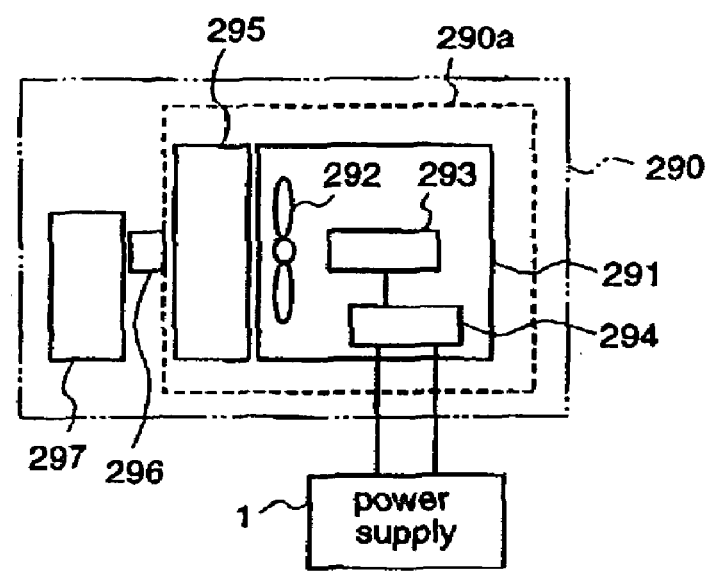
FIG. 16 is a schematic diagram for explaining an electric vacuum cleaner according to a thirteenth embodiment of the present invention.

FIG. 16 is a block diagram for explaining an electric vacuum cleaner according to a thirteenth embodiment of the present invention.

A vacuum cleaner 290 according to the thirteenth embodiment is provided with a floor suction head 297 having an inlet at its bottom, a vacuum cleaner body 290a for sucking air, and a dust suction hose 296 having an end connected to the floor suction head 297 and the other end connected to the cleaner body 290a.

The cleaner body 290a comprises a dust collection chamber 295 having a front surface at which the other end of the dust suction hose 296 is opened, and an electric air blower 291 placed at the rear surface of the dust collecting chamber 295.

The electric air blower 291 comprises a fan 292 placed opposite to the rear surface of the dust collection chamber 295, a motor 293 for rotating the fan, and a motor driving apparatus 294 that is connected to a power supply 1 and drives the motor 293. The air blower 291 performs air blowing so that suction of air is carried out by rotation of the fan 292.

The power supply 1, the motor 293, and the motor driving apparatus 294 are identical to the single-phase AC power supply 1, the motor 2, and the motor driving apparatus 100a according to the first embodiment, respectively, and a rpm command indicating a rpm according to a user operation is input to the motor driving apparatus 294 from a microcomputer (not shown) that controls the operation of the air blower 290.

Next, the operation of the vacuum cleaner 290 will be described.

In the vacuum cleaner 290, when the user performs a predetermined operation, a rpm command is input to the motor driving apparatus 294 from the microcomputer, and a driving voltage is supplied from the motor driving apparatus 294 to the motor 293. Then, the fan 292 is rotated by the motor 293, and a suction force is generated in the cleaner body 290a. The suction force generated in the cleaner body 290a acts on the inlet (not shown) at the bottom of the floor suction head 297 through the dust suction hose 296, and dust on the floor is sucked from the inlet of the floor suction head 297 to be collected into the dust collection chamber of the cleaner body 290a.

At this time, in the vacuum cleaner 290, the rpm of the motor 293 is controlled by the motor driving apparatus 294 on the basis of the rpm command from the microcomputer, as in the first embodiment. Thereby, the strength of the suction force is controlled.

As described above, in the vacuum cleaner 290 according to the thirteenth embodiment, the motor driving apparatus for driving the motor 293 as a power source decreases the current supplied to the motor in the operation section where the power supply voltage v changes from zero to peak, and increases the current in the operation section where the power supply voltage v changes from peak to zero, as in the first embodiment. Therefore, the current outputted from the single-phase AC power supply 1 is leveled, and the values of the capacitor and the inductor in the motor driving apparatus are reduced. Thereby, the motor driving apparatus in the vacuum cleaner is reduced in size and weight while satisfying the restrictions on the input power factor and the IEC harmonics standards, resulting in an inexpensive vacuum cleaner having a high degree of freedom in design.

Fourteenth Embodiment

Figure 17:
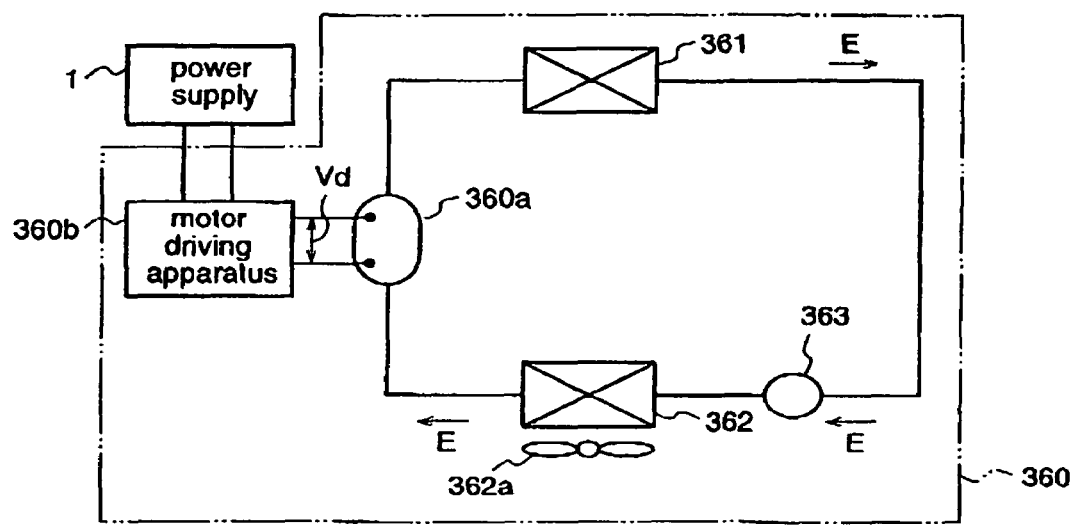
FIG. 17 is a schematic diagram for explaining an electric dryer according to a fourteenth embodiment of the present invention.

FIG. 17 is a block diagram for explaining an electric dryer according to a fourteenth embodiment of the present invention.

An electric dryer 360 according to the fourteenth embodiment comprises a compressor 360a, a motor driving apparatus 360b, a condenser 361, an evaporator 362, and a throttle 363.

The compressor 360a, the condenser 361, the throttle 363, and the evaporator 362 make a refrigerant circulation path. The motor driving apparatus 360b has an input connected to a power supply 1, and drives the motor as a driving source for the compressor 360a. The voltage supply 1, the motor of the compressor 360a, and the motor driving apparatus 360b are identical to the single-phase AC power supply 1, the motor 2, and the motor driving apparatus 100a according to the first embodiment, respectively.

The throttle 363 reduces the flow rate of the fluid refrigerant outputted from the condenser 361 to expand the fluid refrigerant under the state where the refrigerant is circulating in the refrigerant circulation path (in the direction of arrow E), and supplies a proper amount of refrigerant that is required for the evaporator 362.

The condenser 361 condenses the high-temperature and high-pressure refrigerant gas that flows therein, and discharges the heat of the refrigerant to the outside air. The refrigerant gas sent into the condenser 361 gradually liquefies while losing heat to the outside air, resulting in a high-pressure fluid refrigerant in the vicinity of the outlet of the condenser.

The evaporator 362 evaporates the low-temperature fluid refrigerant to dehumidify the inside of the dryer 360. The evaporator 362 has an air blower 362a for increasing efficiency of dehumidification.

In the dryer 360, the motor driving apparatus 360b controls the output of the motor of the compressor 360a on the basis of the operating state of the dryer 360, i.e., the degree of dehumidification set on the dryer 360, and the humidity in the dryer 360.

Next, the operation of the electric dryer 360 will be described.

In the electric dryer 360 according to the fourteenth embodiment, when a driving voltage Vd is applied to the motor of the compressor 360a from the motor driving apparatus 360b, the compressor 360a is driven and the refrigerant is circulated in the direction of arrow E in the refrigerant circulation path, whereby heat exchange is carried out in the condenser 361 and in the evaporator 362. Thereby, dehumidification is carried out in the dryer.

That is, in the dryer 360, the flow rate of the refrigerant, which is liquefied in the condenser 361, is reduced by the throttle 363, and thereby the refrigerant expands, resulting in a low-temperature fluid refrigerant. When the low-temperature fluid refrigerant is sent into the evaporator 362, the low-temperature fluid refrigerant is evaporated in the evaporator 362, whereby the inside of the dryer 360 is dehumidified. To be specific, the moist air in the dryer 360 is cooled down to its dew-point humidity or lower, and the air from which moisture is removed as condensed water is heated again. At this time, the air in the dryer 360 is compulsory sent into the evaporator 362 by the air blower 362a, and thereby heat exchange is efficiently carried out in the evaporator 362.

As described above, in the electric dryer 360 according to the fourteenth embodiment, the motor driving apparatus 360b for driving the motor as a power source for the compressor 360a decreases the current supplied to the motor in the operation section where the power supply voltage v changes from zero to peak, and increases the current in the operation section where the power supply voltage v changes from peak to zero, as in the first embodiment. Therefore, the current outputted from the single-phase AC power supply 1 is leveled, and the values of the capacitor and the inductor in the motor driving apparatus are reduced while minimizing reduction in the power factor due to waveform distortion in the current supplied from the power supply. Thereby, the motor driving apparatus in the electric dryer is reduced in size and weight while satisfying the restrictions on the input power factor and the IEC harmonics standards, resulting in an inexpensive electric dryer having a high degree of freedom in design.

Fifteenth Embodiment

Figure 18:
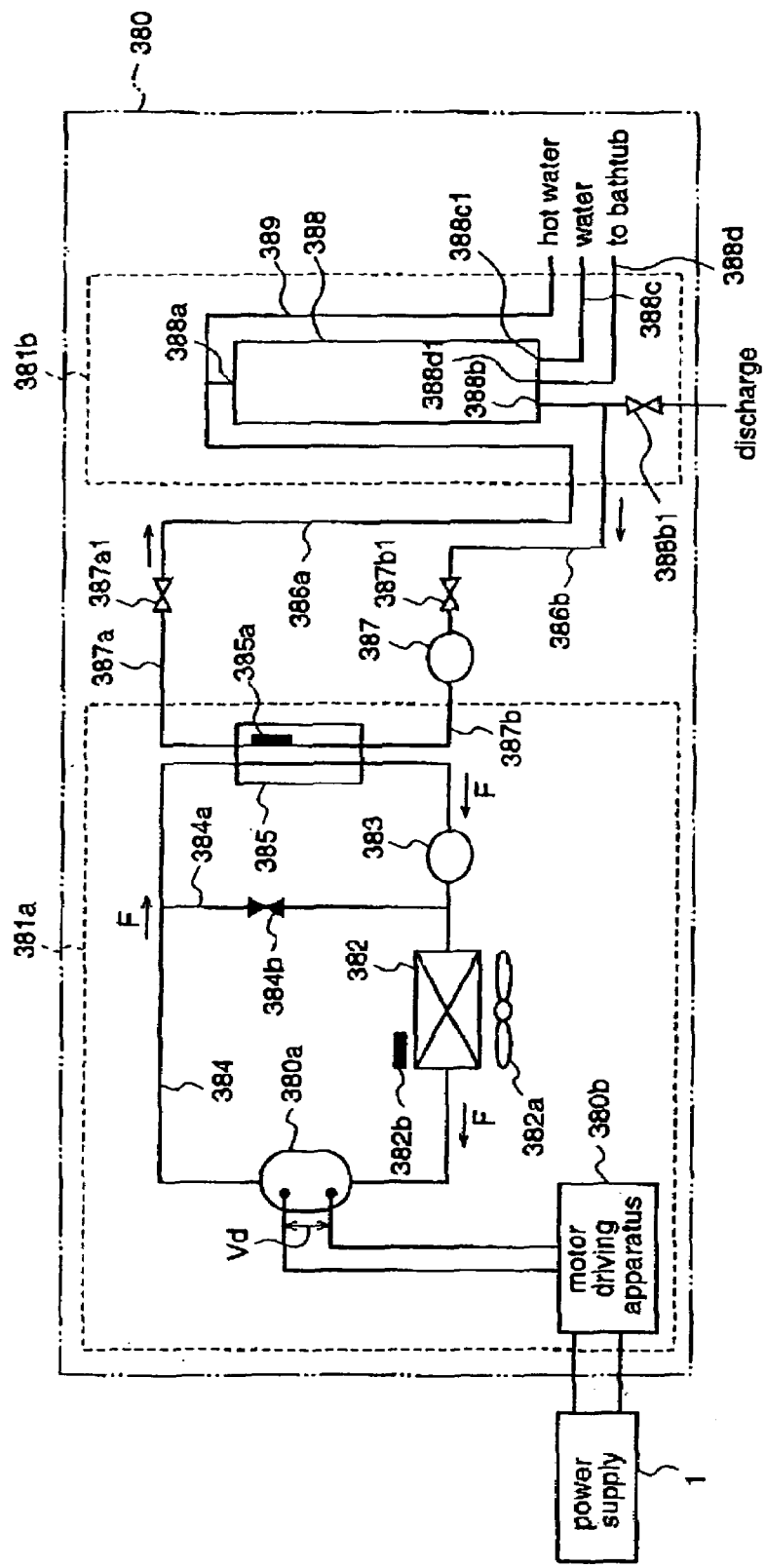
FIG. 18 is a schematic diagram for explaining a heat pump type hot-water supply unit according to a fifteenth embodiment of the present invention.

FIG. 18 is a block diagram for explaining a heat pump type hot-water supply unit according to a fifteenth embodiment of the present invention.

A heat pump type hot-water supply unit 380 according to the fifteenth embodiment includes a refrigeration cycle unit 381a for heating supplied water to discharge hot water, a hot-water storage 381b in which the hot water discharged from the refrigeration cycle unit 381a is stored, and pipes 386a, 386b, 387a, and 387b connecting the refrigeration cycle unit 381a and the hot-water storage 381b.

The refrigeration cycle unit 381a includes a compressor 380a, an air-refrigerant heat exchanger 382, a throttle 383, and a water-refrigerant heat exchanger 385, which constitute a refrigerant circulation path, and a motor driving apparatus 380b that has an input connected to a power supply 1, and drives the motor of the compressor 380a.

The power supply 1, the motor of the compressor 380a, and the motor driving apparatus 380b are identical to the single-phase AC power supply 1, the motor 2, and the motor driving apparatus 100a according to the first embodiment, respectively.

The throttle 383 reduces the flow rate of the fluid refrigerant that is sent from the water-refrigerant heat exchanger 385 to the air-refrigerant heat exchanger 382 to expand the fluid refrigerant, similar to the throttle 253 of the air conditioner 250 of the ninth embodiment.

The water-refrigerant heat exchanger 385 is a condenser that heats up the water supplied to the refrigeration cycle unit 381a, and has a temperature sensor 385a for detecting the temperature of the heated water. The air-refrigerant heat exchanger 382 is an evaporator that absorbs heat from the ambient atmosphere, and has an air blower 382a for increasing the efficiency of heat exchange and a temperature sensor 382b for detecting the ambient temperature.

In FIG. 18, reference numeral 384 denotes a refrigerant pipe for circulating the refrigerant along the refrigerant circulation path (in the direction of arrow F) that is formed by the compressor 380a, the water-refrigerant heat exchanger 385, the throttle 383, and the air-refrigerant heat exchanger 382. The refrigerant pipe 284 is connected to a defrost bypass pipe 384a for supplying the refrigerant discharged from the linear compressor 380a to the air-refrigerant heat exchanger 382, bypassing the water-refrigerant heat exchanger 385 and the throttle 383, and a defrost bypass valve 384b is provided in a portion of the bypass pipe 384a.

The hot-water storage 381b has a hot-water storage tank 388 for keeping water or hot water. A water supply pipe 388c for supplying water from the outside to the storage tank 388 is connected to a water intake port 388c1 of the storage tank 388, and a hot-water supply pipe 388d for supplying hot-water from the storage tank 388 to a bathtub is connected to a hot-water discharge port 388d1 of the storage tank 388. Further, a hot-water supply pipe 389 for supplying the hot water stored in the storage tank 388 to the outside is connected to a water intake/discharge port 388a of the storage tank 388.

The storage tank 388 and the water-refrigerant heat exchanger 385 of the refrigeration cycle unit 381a are connected through pipes 386a, 386b, 387a, and 387b, and a water circulation path is formed between the storage tank 388 and the water-refrigerant heat exchanger 385.

The water supply pipe 386b is a pipe for supplying water from the storage tank 388 to the water-refrigerant heat exchanger 385, and an end of this pipe is connected to a water discharge port 388b of the storage tank 388 while the other end is connected to a water intake side pipe 387b of the water-refrigerant heat exchanger 385 through a joint 387b1. Further, a discharge valve 388b1 for discharging the water or hot water stored in the storage tank 388 is fixed to an end of the water supply pipe 386b. The water supply pipe 386a is a pipe for returning the water from the water-refrigerant heat exchanger 385 to the storage tank 388, and an end of this pipe is connected to the water intake/discharge port 388a of the storage tank 388 while the other end is connected to a discharge side pipe 387a of the water-refrigerant heat exchanger 385 through a joint 387a1.

A pump 387 for circulating the water in the water circulation path is provided in a portion of the water intake side pipe 387b of the water-refrigerant heat exchanger 385.

Further, in the hot-water supply unit 380, a command rpm of the motor of the compressor 380a is determined on the basis of the operating state of the hot-water supply unit 380, that is, the target temperature of hot water which is set on the supply unit, the temperature of the water that is supplied from the hot-water storage 381b to the water-refrigerant heat exchanger 385a of the refrigeration cycle unit 381a, and the outdoor temperature. The motor driving apparatus 380b determines a motor output which is required for the motor of the compressor 380 on the basis of the command rpm.

Next, the operation of the heat pump type hot-water supply unit 380 will be described.

When a driving voltage Vd is supplied from the motor drive control unit 380b to the motor of the compressor 380a to drive the compressor 380a, the high-temperature refrigerant compressed by the compressor 380a circulates in the direction of arrow F, that is, the refrigerant passes through the refrigerant pipe 384 and is supplied to the water-refrigerant heat exchanger 385. Further, when the pump 387 in the water circulation path is driven, water is supplied from the storage tank 388 to the water-refrigerant heat exchanger 385.

In the water-refrigerant heat exchanger 385, heat exchange is carried out between the refrigerant and the water that is supplied from the storage tank 388, whereby heat moves from the refrigerant to the water. That is, the supplied water is heated, and the heated water (hot water) is supplied to the storage tank 388. At this time, the temperature of the heated water is observed by the condensation temperature sensor 385a.

Further, in the water-refrigerant heat exchanger 385, the refrigerant is condensed by the above-mentioned heat exchange, the flow rate of the condensed fluid refrigerant is reduced by the throttle 383 to expand the refrigerant, and the refrigerant is sent to the air-refrigerant heat exchanger 382. In the hot-water supply unit 380, the air-refrigerant heat exchanger 382 serves as an evaporator. That is, the air-refrigerant heat exchanger 382 absorbs heat from the outside air that is sent by the air blower 383a to evaporate the low-temperature fluid refrigerant. At this time, the temperature of the ambient atmosphere of the air-refrigerant heat exchanger 382 is observed by the temperature sensor 382b.

Further, in the refrigeration cycle unit 381a, when the air-refrigerant heat exchanger 382 is frosted, the defrost bypass valve 384b is opened, and the high-temperature refrigerant is supplied to the air-refrigerant heat exchanger 382 through the defrost bypass line 384a. Thereby, the air-refrigerant heat exchanger 382 is defrosted.

On the other hand, the hot water is supplied from the water-refrigerant heat exchanger 385 of the refrigeration cycle unit 381a to the hot-water storage 381b through the pipes 87a and 86a, and the supplied hot water is stored in the storage tank 388. The hot water in the storage tank 388 is supplied to the outside through the hot-water supply pipe 389 as required. Especially when the hot water is supplied to a bathtub, the hot water in the storage tank 388 is supplied to the bathtub through a hot-water supply pipe 388d for the bathtub.

Further, when the amount of water or hot water stored in the storage tank 388 becomes lower than a predetermined amount, water is supplied from the outside through the water supply pipe 388c.

In the hot-water supply unit 380, the motor driving apparatus 380b determines a command rpm of the motor, on the basis of the target temperature of the hot water, which is set on the hot-water supply unit 380, the temperature of the water supplied to the water-refrigerant heat exchanger 385a and the outside temperature, and the motor driving apparatus 380b controls the rpm of the motor of the compressor 380a on the basis of the command rpm. Thereby, hot water of the target temperature is supplied by the hot-water supply unit 380.

As described above, in the heat pump type hot-water supply unit 380 according to the fifteenth embodiment, the motor driving apparatus for driving the motor as a power source for the compressor 380a decreases the current supplied to the motor in the operation section where the power supply voltage v changes from zero to peak, and increases the current in the operation section where the power supply voltage v changes from peak to zero, as in the first embodiment. Therefore, the current outputted from the single-phase AC power supply 1 is leveled, and the values of the capacitor and the inductor in the motor driving apparatus are reduced while minimizing reduction in the power factor due to waveform distortion in the current supplied from the power supply. Thereby, the motor driving apparatus in the heat pump type hot-water supply unit is reduced in size and weight while satisfying the restrictions on the input power factor and the IEC harmonics standards, resulting in an inexpensive heat pump type hot-water supply unit having a high degree of freedom in design.

While in the ninth to fifteenth embodiments the motor driving apparatus for driving the motor as a power source is identical to the motor driving apparatus according to the first embodiment, the motor driving apparatus according to the ninth to fifteenth embodiments may be any of the motor driving apparatuses according to the second to eighth embodiments.

The motor driving apparatus according to the present invention can improve the input power factor without modulating the waveform of the motor driving current or performing advance control for the driving voltage to be output to the motor. Therefore, the motor driving apparatus of the present invention is extremely useful as a motor driving apparatus for an induction motor, a DC brushless motor, a reluctance motor, or the like.

What is claimed is:

1. A motor driving apparatus for driving a motor, said motor driving apparatus comprising:
   a rectifier circuit having an input to be connected to a single-phase AC power supply;
   an inverter circuit connected to said rectifier circuit, said inverter circuit being operable to output a current and a voltage to the motor; and
   an inverter control unit operable to control said inverter circuit so as to drive the motor;
   wherein said inverter control unit includes a power supply voltage estimation unit operable to estimate a voltage of the single-phase AC power supply, and said inverter control unit is operable to change the value of the current or voltage outputted from said inverter circuit so that a waveform of an input voltage of said inverter circuit which is outputted from said rectifier circuit to said inverter circuit becomes equal or approximate to an absolute value of a waveform of an output voltage of the single-phase AC power supply, based on the power supply voltage estimated by said power supply voltage estimation unit.

2. A motor driving apparatus as defined in claim 1, wherein:
said inverter control unit is operable to perform at least one of a first control and a second control;
the first control is said inverter control unit decreasing the value of the output current or output voltage of said inverter circuit when the power supply voltage estimated by said power supply voltage estimation unit is changing from a zero voltage to a peak voltage; and
the second control is said inverter control unit increasing the value of the output current or output voltage of said inverter circuit when the power supply voltage estimated by said power supply voltage estimation unit is changing from the peak voltage to the zero voltage.

3. A motor driving apparatus as defined in claim 1, wherein:
said power supply voltage estimation unit has a zerocross detection unit for detecting a zerocross timing of the single-phase AC power supply; and
said power supply voltage estimation unit is operable to estimate a voltage of the single-phase AC power supply from the zerocross timing detected by said zerocross detection unit.

4. A motor driving apparatus as defined in claim 1, wherein:
said inverter control unit has an inverter input voltage detection unit for detecting the voltage inputted to said inverter circuit;
said inverter control unit is operable to
compare the absolute value of the power supply voltage estimated by said power supply voltage estimation unit with the inverter input voltage detected by said inverter input voltage detection unit, and
perform at least one of a first control and a second control;
the first control is said inverter control unit increasing the value of the output current or output voltage of said inverter circuit when the inverter input voltage detected by said inverter input voltage detection unit is higher than an absolute value of the power supply voltage estimated by said power supply voltage estimation unit; and
the second control is said inverter control unit decreasing the value of the output current or output voltage of said inverter circuit when the inverter input voltage detected by said inverter input voltage detection unit is lower than the absolute value of the power supply voltage estimated by said power supply voltage estimation unit.

5. A motor driving apparatus as defined in claim 4, wherein: the motor is a DC brushless motor;
the first control is said inverter control unit advancing the phase of the output current or output voltage of said inverter circuit to increase the value of the output current or output voltage of said inverter circuit; and
the second control is said inverter control unit delaying the phase of the output current or output voltage of said inverter circuit to decrease the value of the output current or output voltage of said inverter circuit.

6. A motor driving apparatus as defined in claim 4, wherein: the motor is an induction motor;
the first control is said inverter control unit decreasing the angular velocity of the output current or output voltage of said inverter circuit to increase the value of the output current or output voltage of said inverter circuit; and
the second control is said inverter control unit increasing the angular velocity of the output current or output voltage of said inverter circuit to decrease the value of the output current or output voltage of said inverter circuit.

7. A motor driving apparatus as defined in claim 4, wherein:
said power supply voltage estimation unit includes a timing detection unit for detecting a timing at which the inverter input voltage attains a maximum value, based on the inverter input voltage detected by said inverter input voltage detection unit; and
said power supply voltage estimation unit is operable to estimate a voltage of the single-phase AC power supply based on the timing detected by said timing detection unit, and the inverter input voltage value that is an output from said inverter input voltage detection unit at the timing detected by said timing detection unit.

8. A motor driving apparatus as defined in claim 1, wherein said rectifier circuit has a capacitor for charging a regenerative current from the motor.

9. A motor driving apparatus as defined in claim 1, wherein said rectifier circuit has an inductor for cutting noise that occurs in said inverter circuit.

10. A compressor including a motor for generating a power, and a motor driving apparatus for driving said motor, wherein said motor driving apparatus is a motor driving apparatus as defined in claim 1.

11. An air conditioner including a compressor having a motor for generating a power, and a motor driving apparatus for driving said motor of said compressor, wherein said motor driving apparatus is a motor driving apparatus as defined in claim 1.

12. A refrigerator including a compressor having a motor for generating a power, and a motor driving apparatus for driving said motor of said compressor, wherein said motor driving apparatus is a motor driving apparatus as defined in claim 1.

13. An electric washing machine including a motor for generating a power, and a motor driving apparatus for driving said motor, wherein said motor driving apparatus is a motor driving apparatus as defined in claim 1.

14. An air blower including a motor for generating a power, and a motor driving apparatus for driving said motor, wherein said motor driving apparatus is a motor driving apparatus as defined in claim 1.

15. An electric vacuum cleaner including a motor for generating a power, and a motor driving apparatus for driving said motor, wherein said motor driving apparatus is a motor driving apparatus as defined in claim 1.

16. An electric dryer including a compressor having a motor for generating a power, and a motor driving apparatus for driving said motor of said compressor, wherein said motor driving apparatus is a motor driving apparatus as defined in claim 1.

17. A heat pump hot-water supply unit including a compressor having a motor for generating a power, and a motor driving apparatus for driving said motor of said compressor, wherein said motor driving apparatus is a motor driving apparatus as defined in claim 1.

* * * * *